US011595079B2

(12) United States Patent
Ellena et al.

(10) Patent No.: US 11,595,079 B2
(45) Date of Patent: Feb. 28, 2023

(54) HIGH-THROUGHPUT DATA COMMUNICATION FOR RAIL-MOUNTED DEVICES

(71) Applicant: T-Worx Holdings, LLC, Sterling, VA (US)

(72) Inventors: Joseph Douglas Ellena, Herndon, VA (US); Tho Nguyen, Ashburn, VA (US); Tyler Jonathan Miller, Dickerson, MD (US); Benjamin Freed Feldman, Reston, VA (US)

(73) Assignee: T-Worx Holdings, LLC, Sterling, VA (US)

( * ) Notice: Subject to any disclaimer, the term of this patent is extended or adjusted under 35 U.S.C. 154(b) by 0 days.

(21) Appl. No.: 17/221,497

(22) Filed: Apr. 2, 2021

(65) Prior Publication Data
US 2021/0391892 A1 Dec. 16, 2021

Related U.S. Application Data

(60) Provisional application No. 63/004,477, filed on Apr. 2, 2020.

(51) Int. Cl.
*H04B 3/54* (2006.01)
*F41C 27/00* (2006.01)
*H02J 4/00* (2006.01)

(52) U.S. Cl.
CPC ............... *H04B 3/54* (2013.01); *F41C 27/00* (2013.01); *H02J 4/00* (2013.01)

(58) Field of Classification Search
CPC .................. F41C 27/00; H02J 13/00016; H02J 13/00034; H02J 13/0062; H04B 3/54
(Continued)

(56) References Cited

U.S. PATENT DOCUMENTS 7,627,975 B1 12/2009 Hines
8,322,064 B2 12/2012 Cabahug et al.
(Continued)

FOREIGN PATENT DOCUMENTS

CN 101213768 A 7/2008
EP 3372947 A1 9/2018
(Continued)

OTHER PUBLICATIONS

PCT Searching Authority; Notification of International Search Report and Written Opinion for PCT/US2021/025628 dated Jun. 15, 2021, 16 pages.
(Continued)

*Primary Examiner* — Emmanuel Bayard
(74) *Attorney, Agent, or Firm* — Merchant & Gould P.C.

(57) ABSTRACT

An electronic system for a firearm includes a power source, one or more electrical conductors electrically connected to receive power from the power source, and a plurality of electronic devices. Each electronic device has an electrical input configured to receive power from the one or more electrical conductors to power the electronic device. A communication device is configured for data communication across the one or more electrical conductors. In some embodiments data can be communicated at rates greater than 10 Mbps. Some embodiments utilize multi-frequency encoding, such as orthogonal frequency-division multiplexing. Some embodiments include a data communication device with a lower data communication rate and another data communication device with a higher data communication rate, and can selectively communicate through either data communication device. A method of communicating between electronic devices connected to a firearm includes powering a plurality of electronic devices connected to a firearm from a power source through one or more electrical
(Continued)

conductors, and communicating data between the plurality of electronic devices across the one or more electrical conductors.

18 Claims, 20 Drawing Sheets

(58) Field of Classification Search
 USPC .......................................................... 375/257
 See application file for complete search history.

(56) References Cited

U.S. PATENT DOCUMENTS

| | | | |
|---|---|---|---|
| 8,402,683 B2 | 3/2013 | Cabahug et al. | |
| 8,443,539 B2 | 5/2013 | Cabahug et al. | |
| 8,448,368 B2 | 5/2013 | Cabahug et al. | |
| 8,490,313 B2 | 7/2013 | Frascati et al. | |
| 8,516,731 B2 | 8/2013 | Cabahug et al. | |
| 9,049,087 B2 | 6/2015 | Matsutani et al. | |
| 10,277,288 B1* | 4/2019 | Anderson | H04W 76/16 |
| 2008/0270528 A1* | 10/2008 | Girardeau | H04L 1/0007 |
| | | | 709/203 |
| 2010/0284451 A1* | 11/2010 | Murari | G06F 13/385 |
| | | | 375/220 |
| 2012/0224456 A1* | 9/2012 | Visser | G01S 7/521 |
| | | | 367/118 |
| 2013/0185978 A1 | 7/2013 | Dodd et al. | |
| 2014/0068990 A1 | 3/2014 | Cabahug et al. | |
| 2014/0360077 A1* | 12/2014 | Miller | F41G 1/387 |
| | | | 42/84 |
| 2015/0041538 A1* | 2/2015 | Teetzel | F41G 3/06 |
| | | | 235/404 |
| 2017/0205202 A1 | 7/2017 | Teetzel et al. | |
| 2018/0328698 A1 | 11/2018 | Miller et al. | |
| 2019/0137213 A1 | 5/2019 | Miller et al. | |
| 2019/0310051 A1 | 10/2019 | Cabahug et al. | |
| 2019/0353461 A1* | 11/2019 | Neal | F41G 11/003 |

FOREIGN PATENT DOCUMENTS

| | | |
|---|---|---|
| WO | 2009098965 A1 | 8/2009 |
| WO | 2019176931 A1 | 9/2019 |

OTHER PUBLICATIONS

Wikipedia; Orthogonal frequency-division multiplexing; Apr. 1, 2020; 15 pages.

* cited by examiner

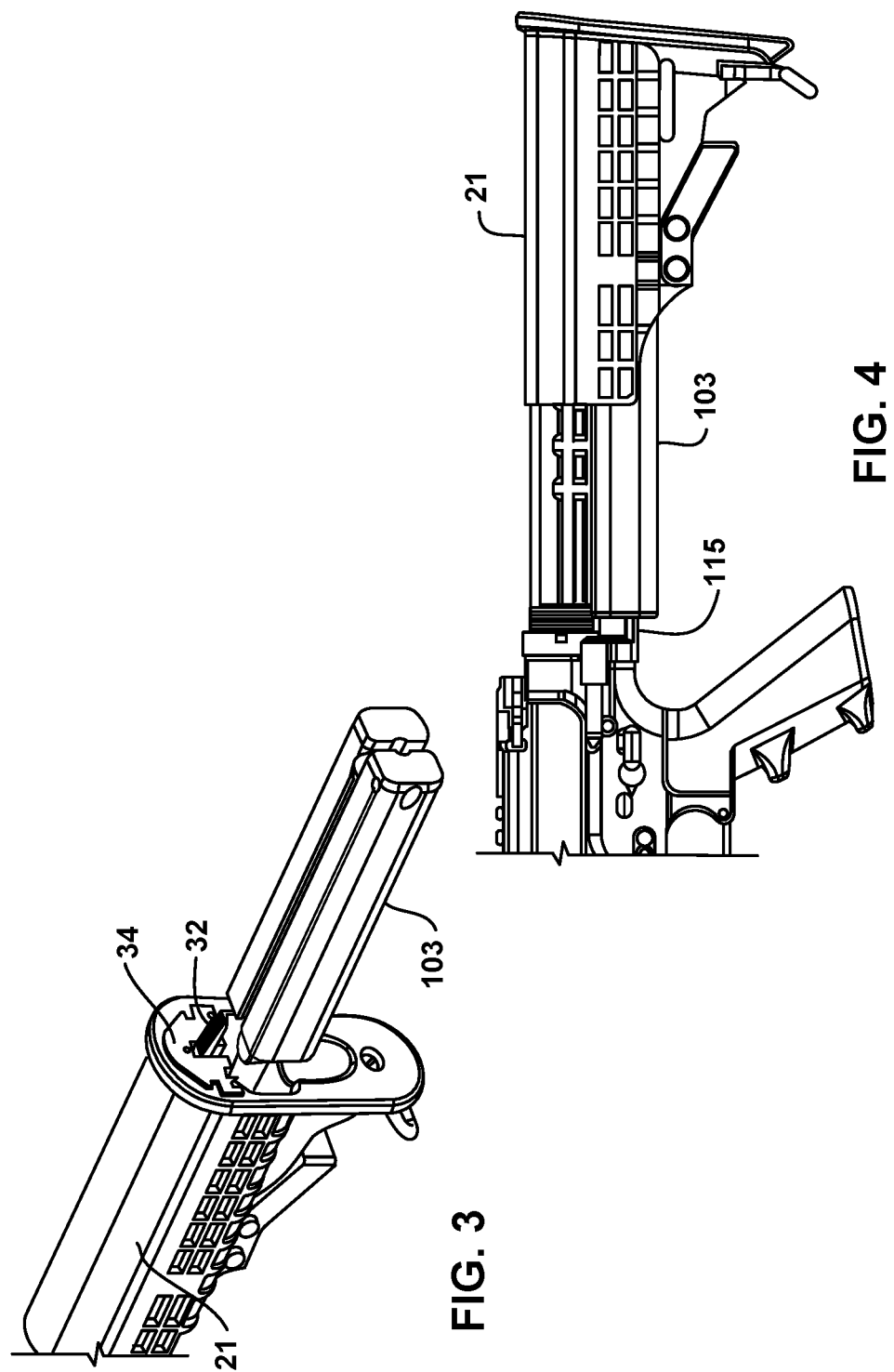

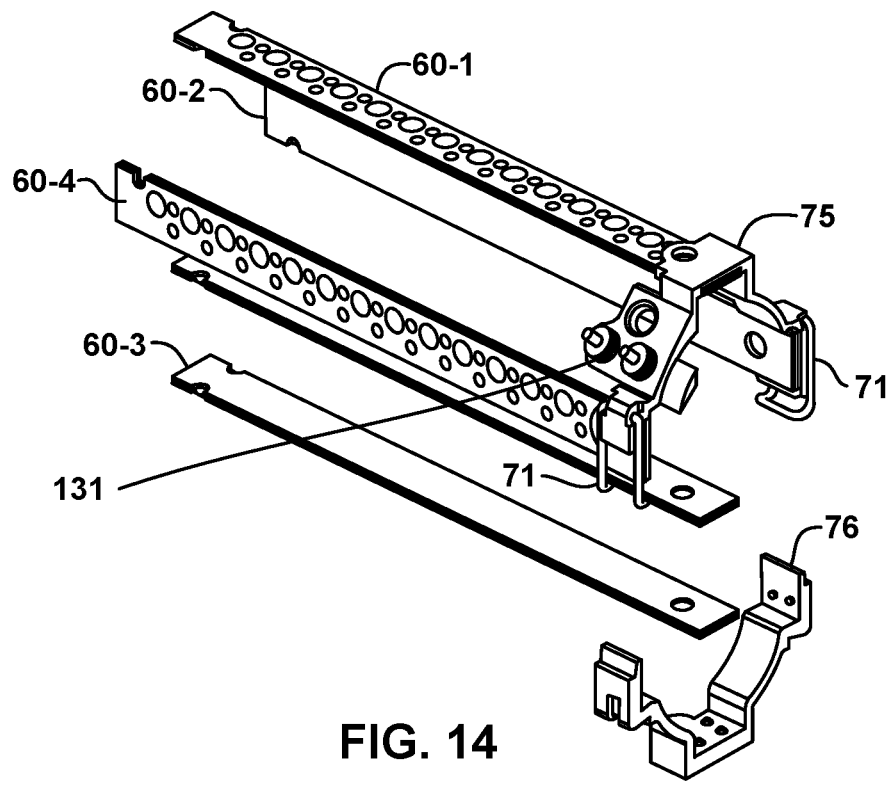
FIG. 14
FIG. 15
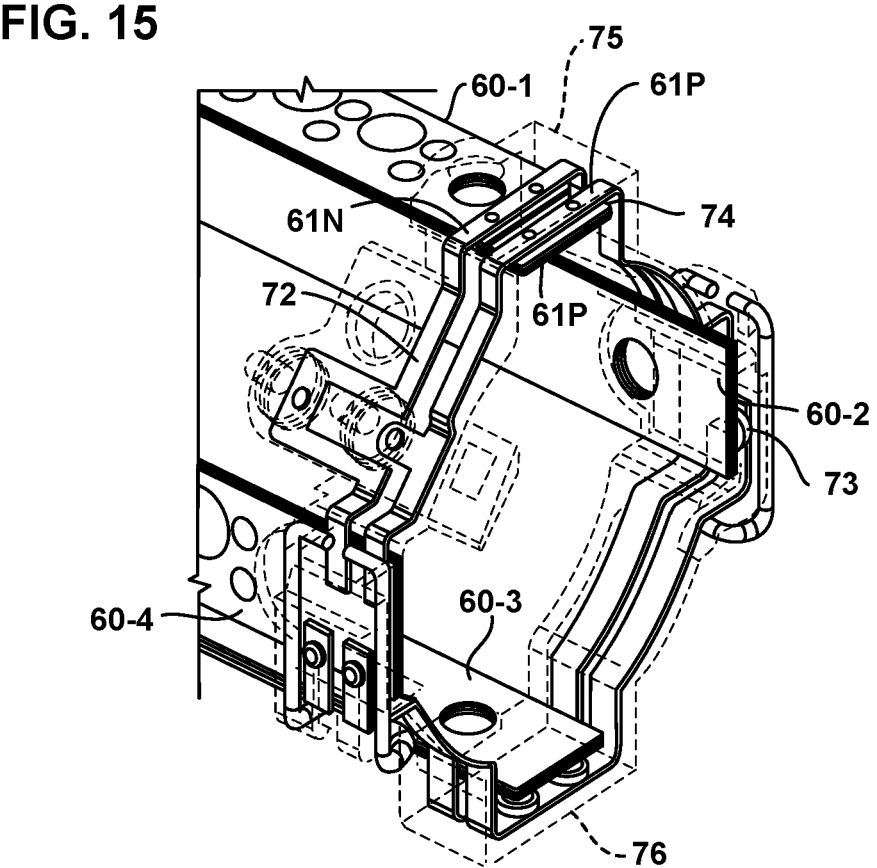

HIGH-THROUGHPUT DATA COMMUNICATION FOR RAIL-MOUNTED DEVICES

CROSS-REFERENCE TO RELATED APPLICATIONS

This application claims priority to U.S. Application No. 63/004,477, filed on Apr. 2, 2020, the disclosure of which is hereby incorporated by reference in its entirety.

INTRODUCTION

Electronic devices such as lights, cameras, laser range finders, infrared sensors, displays, and radios are often added to firearms to improve the situational awareness of the firearm user. However, these electronic firearm devices generally cannot interoperate and communicate with one another. Hence, there is a need for a secure and reliable communication system and method that allows electronic firearm devices to communicate with one another and to external devices for improving a firearm user's situational awareness.

SUMMARY

In one aspect, the present disclosure relates generally to a system for networking firearm-mounted devices to one another and to an external device.

One aspect is an electronic system for a firearm, the electronic system comprising: a rail including one or more electrical conductors, the conductors being configured to receive power from a power source; and plurality of electronic devices mountable on the rail to connect the electronic devices to the one or more electrical conductors, each electronic device having: an electrical input configured to receive power from the one or more electrical conductors; and a communication device configured for data communication across the one or more electrical conductors, wherein the communication is configured for data communication at rates greater than 10 megabit per second.

Another aspect is the preceding electronic system, wherein the communication device utilizes a multi-frequency encoding scheme. One example of a multi-frequency encoding scheme is orthogonal frequency division multiplexing (OFDM).

A further aspect is the preceding electronic system, wherein at least one of the electronic devices comprises a PHY-to-MAC bus in data communication with the communication device. An example of the PHY-to-MAC bus is a media-independent interface bus.

Yet another aspect is the preceding electronic system, wherein the communication device comprises at least two communication devices, including a lower data rate communication device and a higher data rate communication device.

Another aspect is the preceding electronic system, wherein the lower data rate communication device utilizes Manchester encoding.

A further aspect is a firearm comprising the preceding electronic system.

Yet another aspect is a rail-mountable accessory configured to be mounted to a rail, the rail including one or more electrical conductors configured to receive power from a power source, the rail-mountable accessory comprising: a power consuming component configured to receive and be powered by power on the rail conductors; and a communication device configured for data communication across the one or more electrical conductors, wherein the communication is configured for data communication at rates greater than 10 megabit per second.

Another aspect is the preceding rail-mountable accessory, wherein the communication device is configured to communicate using multi-frequency encoding. One example of multi-frequency encoding is OFDM encoding. Another example of multi-frequency encoding is Quadrature Amplitude Modulation. Another example is quantized Quadrature Amplitude Modulation.

A further aspect is an intelligent rail system for a firearm, the intelligent rail system comprising: a power source; one or more electrical conductors electrically connected to receive power from the power source, at least part of the one or more electrical conductors being arranged on a rail; and a plurality of electronic devices, at least one electronic device is mounted to the rail, and each electronic device having: an electrical input configured to receive power from the one or more electrical conductors to power the electronic device; and a communication device configured for data communication across the one or more electrical conductors at a data rate greater than 10 Mbps.

Yet another aspect is a method of communicating between electronic devices connected to a firearm, the method comprising: powering a plurality of electronic devices connected to a firearm from a single power source through one or more electrical conductors; and communicating data between the plurality of electronic devices across the one or more electrical conductors at data rates greater than 10 Mbps.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings.

FIG. 3 is an isometric view of a power source for the power distribution system.

FIG. 4 is a side view of the power source for the power distribution system.

FIG. 14 is an exploded view of an electrical interconnection for the intelligent rail.

FIG. 15 is an assembled view of an electrical interconnection for the intelligent rail.

DETAILED DESCRIPTION

Figure 1:
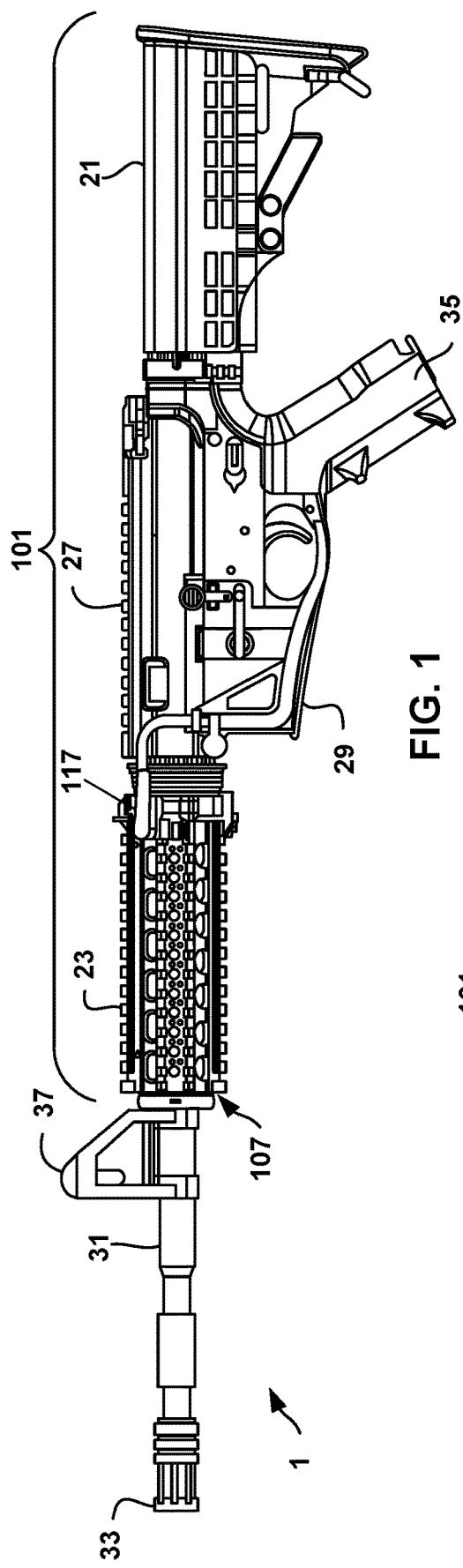
FIG. 1 is a side view of a firearm with a power distribution system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
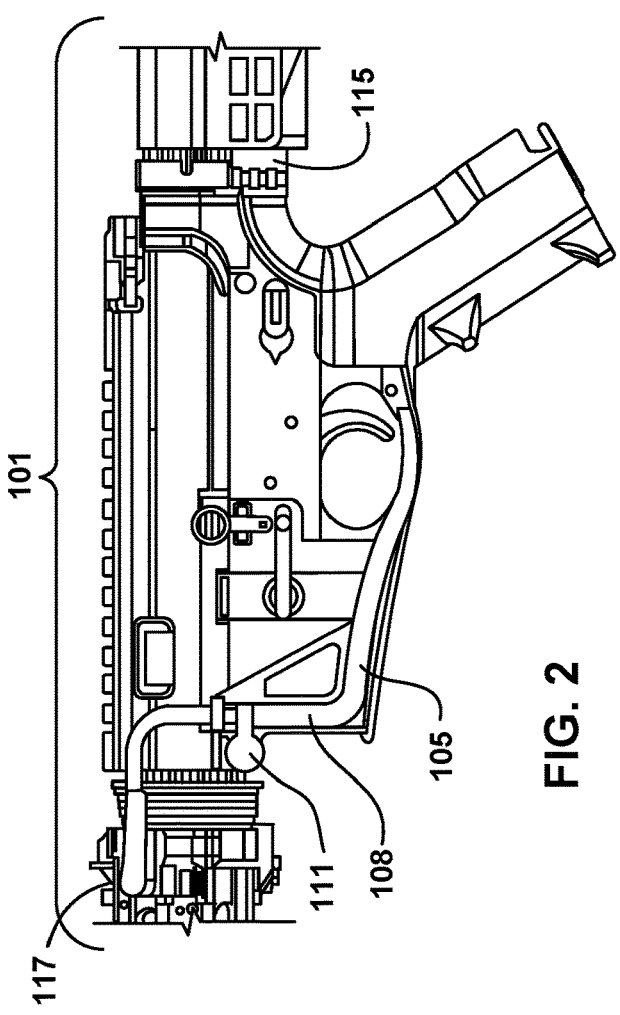
FIG. 2 is a detailed side view of the firearm with the power distribution system.

FIG. 1 is a side view of a firearm 1 with a power distribution system 101. FIG. 2 is a detailed side view of the firearm 1 with the power distribution system 101. As shown in FIGS. 1 and 2, the firearm 1 includes a buttstock 21, a handguard 23, an upper receiver 27, a lower receiver 29, a barrel 31, a muzzle 33, a grip 35, and a front sight 37. While a military-style firearm is described herein, the power distribution system 101 can be added to a firearm, such as the firearm 1, as described herein as well as to other types of firearms, such as handguns, fixed-mount machine guns, bolt action rifles, etc.

The handguard 23 shrouds the barrel 31 of the firearm 1 to enable a user to grip the forward portion of the firearm 1. The handguard 23 mitigates the possibility of burning the user's hand when firing the firearm 1, while also providing adequate cooling for the barrel 31 of the firearm 1. The handguard 23 partially shields the barrel 31 like traditional Picatinny Rail.

The power distribution system 101 includes a power source 103 (shown in FIGS. 3 and 4), a power connector 105, an intelligent rail 107, and one or more electronic firearm devices 300 (shown in FIGS. 16 and 17) configured for attachment to the intelligent rail 107.

The handguard 23 and intelligent rail 107 are attached together to form a handguard structure which encircles the barrel 31 of the firearm 1. As used throughout this disclosure, the term "handguard structure" represents the sections of the handguard 23 and the intelligent rail 107 which encircle the barrel 31 as shown in FIG. 1. The intelligent rail 107 in effect forms facets around the periphery of the resultant handguard structure.

In alternative examples, there is no requirement to include the handguard 23 as an integral component of the power distribution system 101. As such, the handguard 23 is optional, and the intelligent rail 107 can be attached to the firearm 1 in some other manner, such as by being attached to a rail on the upper receiver 27.

FIGS. 3 and 4 show the power source 103 of the power distribution system 101. In the example shown in FIGS. 3 and 4, the power source 103 is mounted inside a cavity 34 of the buttstock 21, and is a removable battery pack. In alternative examples, the power source 103 can be implemented in a number of assemblies and mounted on various portions of the firearm (such as in the handguard 23, in a pistol grip, or in a remote power source, and the like).

The buttstock 21 includes a cam latch 32 for holding the power source 103. The buttstock 21 allows the power source 103 to be installed and removed through the rear of the firearm 1. The length of the buttstock 21 is adjustable such that the buttstock 21 can be extended in various multiple intermediate positions to provide an adjustable length of the firearm 1. By moving the mass of the power source 103 to the rear on the firearm 1, the time to bring the firearm 1 to point, and to "stop" the muzzle when a target is acquired, are reduced.

Referring back to FIGS. 1 and 2, the power source 103 is electrically connected to the intelligent rail 107 via a wire routed inside a durable and impact resistant polymer shroud 108 that conforms to the lower receiver 29. The shroud 108 is securely retained by a quick connect/disconnect pivot and takedown pin 111. The wire in the shroud 108 runs from a power socket 115 at the power source 103 to a power rail connector 117 (shown in more detail in FIGS. 5-7). This configuration provides an easy access for replacing or repairing the cable assembly of the power distribution system 101, and eliminates snag hazards or interferences with the firearm's operation, and requires no modification of the lower receiver 29.

Figure 5:
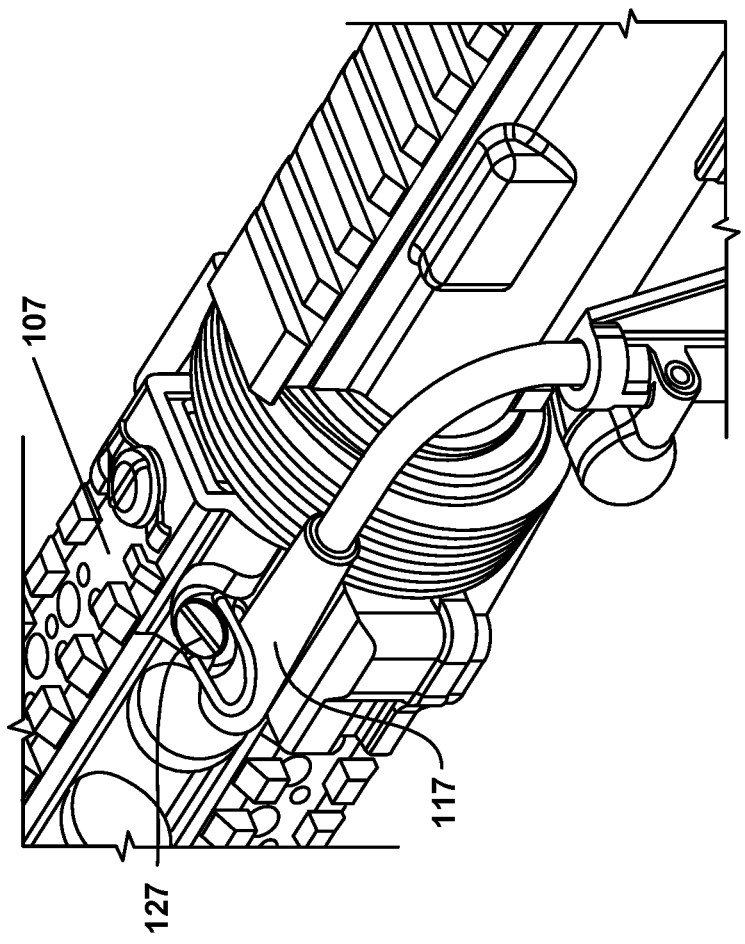
FIG. 5 is an isometric view of an interconnection of a power rail connector to an intelligent rail in the power distribution system of the firearm.
Figure 6:
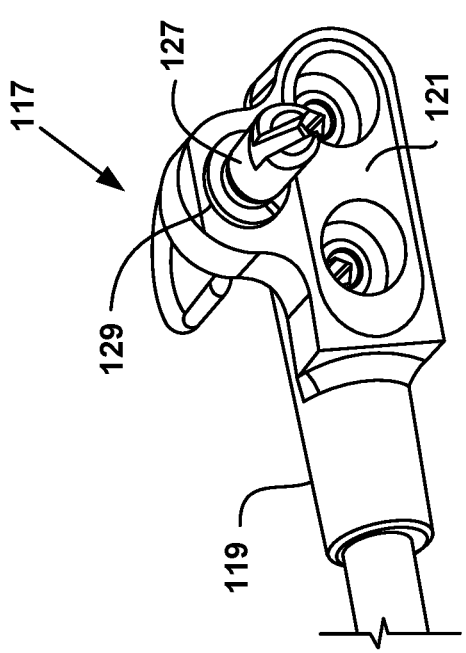
FIG. 6 is an isometric view of the power rail connector.
Figure 7:
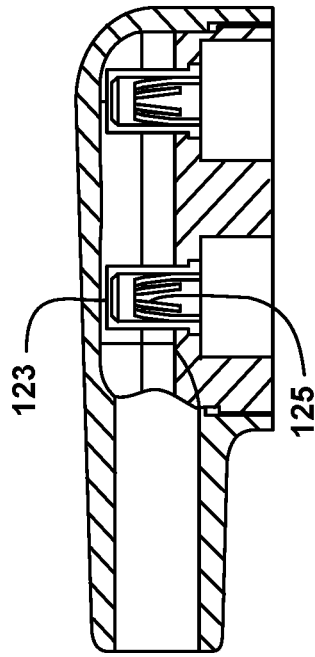
FIG. 7 is a cross-sectional view of the power rail connector.

FIG. 5 is an isometric view of an interconnection of the power rail connector 117 to the intelligent rail 107. FIG. 6 is an isometric view of the power rail connector 117. FIG. 7 is a cross-sectional view of the power rail connector 117. As shown in FIGS. 5-7, the power rail connector 117 has a housing 119 and ruggedized power rail connector 121 where sealing integrity is maintained during exposure to adverse environmental conditions. The power rail connector 117 includes a metallic shell body, contact pin receptacle 123, with a multi-finger spring contact 125 assembled into the contact pin receptacle 123. The multi-finger spring contact 125 complies to variations in rail pin contacts 131 (shown in FIG. 15) to ensure continuous current carrying capacity. The contact pin receptacle 123 includes a solder tail portion for soldering cable wires. A fastener 127 and retaining ring 129 can be used to secure the power rail connector 117 into the rail pin contacts 131 for supplying power to the intelligent rail 107.

The intelligent rail 107 electrically interconnects the power source 103 with various electronic firearm devices that can be mounted onto the intelligent rail 107. In some examples, the intelligent rail 107 can provide both mechanical support and electrical power to each firearm device. In these examples, the intelligent rail 107 can be attached to and be coextensive with the handguard 23 sections, such that the mounting of a power-consuming electronic firearm device on the intelligent rail 107 results in simultaneous mechanical and electrical interconnection.

Figure 8:
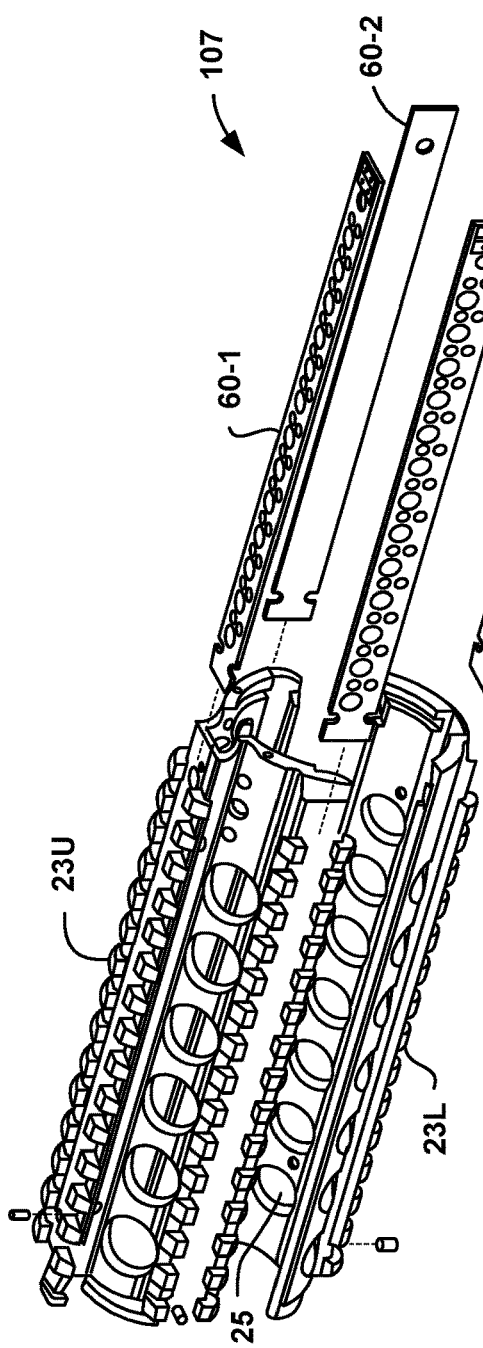
FIG. 8 is an exploded view of a handguard structure including the intelligent rail.
Figure 9:
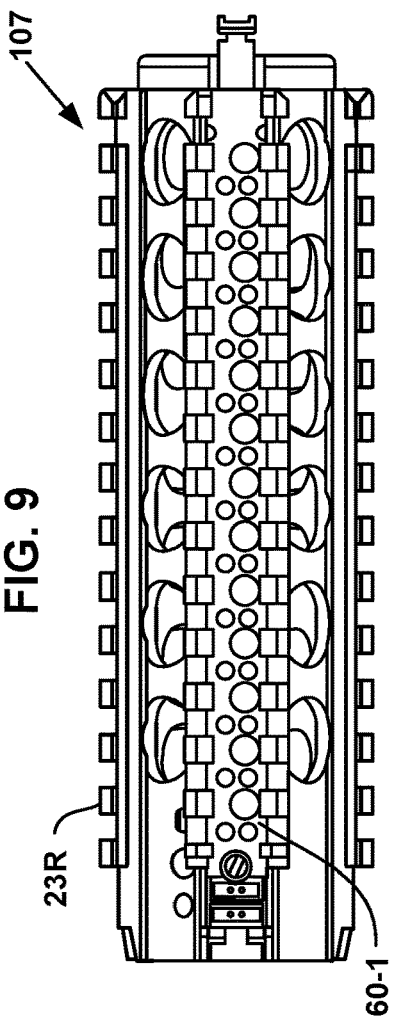
FIG. 9 is a top view of the handguard structure including the intelligent rail.

FIG. 8 is an exploded view of the handguard structure including the intelligent rail 107. FIG. 9 is a top view of the handguard structure including the intelligent rail 107. As shown in FIGS. 8 and 9, the handguard structure includes a series of ridges with a T-shaped cross-section interspersed with flat "locking slots". In this example, the handguard structure is a modified Picatinny Rail which has milling slots along the length of the mechanical accessory attachment points 23R in the upper handguard section 23U and the lower handguard section 23L in order to install one or more power distribution printed circuit boards 60-1 . . . 60-4.

Figure 10:
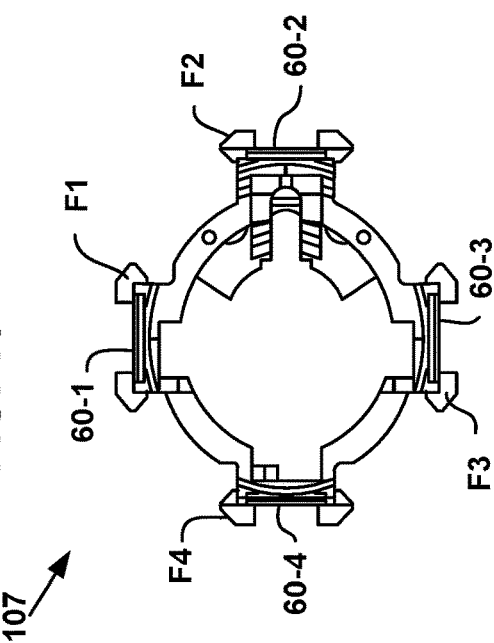
FIG. 10 is an end view of the handguard structure including the intelligent rail.

FIG. 10 is an end view of the handguard structure including the intelligent rail 107. FIG. 10 shows the slots formed in the various facets F1-F4 of the intelligent rail 107. As with a Picatinny Rail, apertures 25 (shown in FIG. 8) are provided along the length of the intelligent rail 107 to enable the barrel 31 of the firearm 1 to be cooled by air circulation from the ambient environment. Other intelligent rail configurations are possible, and the configuration shown in FIGS. 8-10 is provided as one example of the power distribution system 101.

One or more of the printed circuit boards 60-1 . . . 60-4 can be inserted into the respective slots formed in the intelligent rail 107, such as on the corresponding facets F1 . . . F4 of the handguard 23, thereby enabling power-consuming electronic firearm devices 300 to be attached to the handguard 23 via the intelligent rail 107 and to be powered by a corresponding printed circuit board 60-1 . . . 60-4 of the intelligent rail 107.

Figure 11:
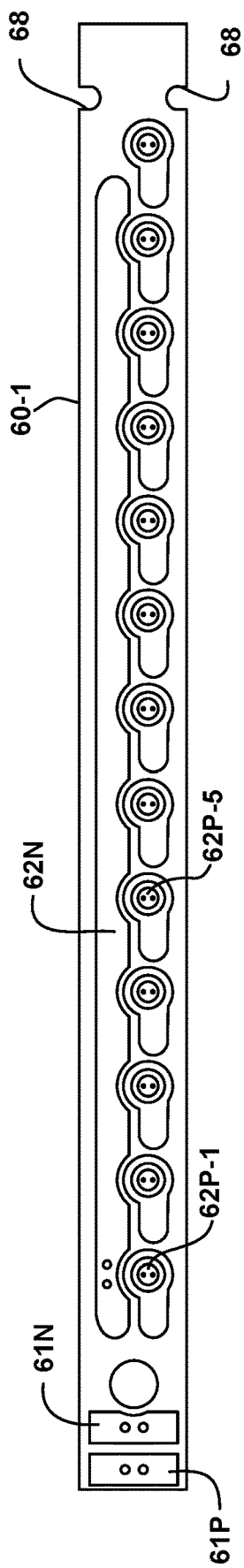
FIG. 11 is a plan view of a printed circuit board of the intelligent rail.
Figure 12:
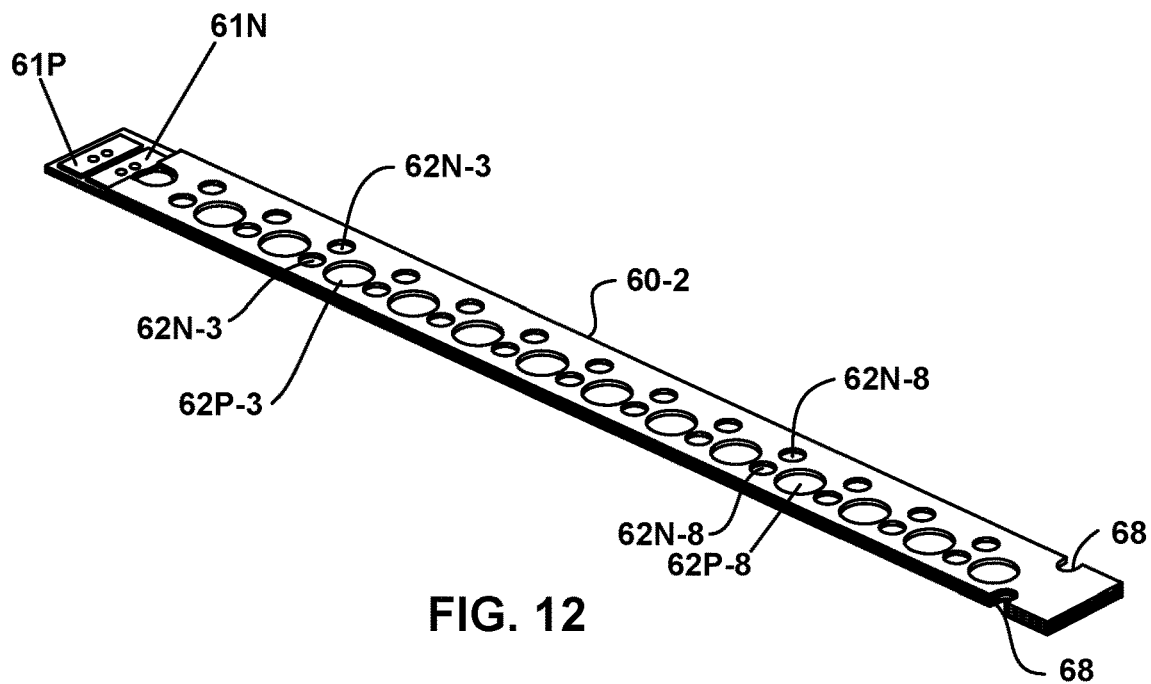
FIG. 12 is an isometric view of a printed circuit board of the intelligent rail.

FIG. 11 is a plan view of a printed circuit board 60-1 of the intelligent rail 107. FIG. 12 is an isometric view of another printed circuit board 60-2 of the intelligent rail 107. FIGS. 11 and 12 illustrate the architecture of the printed circuit boards 60-1 and 60-2 where power is applied via the positive connector contact 61P and the negative connector contact 61N. Power is routed by electrical traces on the printed circuit boards 60-1 and 60-2. The positive current from positive connector contact 61P is routed to the center of the printed circuit board where it is switched via operation of a switch (such as the snap dome switch 64 shown in FIG. 13) to contact 62P-5, while the negative current from the negative connector contact 61N is routed to a negative bus 62N (shown in the printed circuit board 60-1 of FIG. 11) or negative bus contact pads such as negative bus contact pads 62N-3, 62B-8 (shown in the printed circuit board 60-2 of FIG. 12). In the example printed circuit boards 60-1, 60-2 depicted in FIGS. 11 and 12, notches 68 are points of attachment which can be used to secure the printed circuit boards 60-1, 60-2 in a corresponding slot of the intelligent rail 107 via a pin clip arrangement.

In the example printed circuit boards 60-1, 60-2 of FIGS. 11 and 12, there are thirteen positions where a power-consuming electronic firearm device can be attached to contact the power contacts of the intelligent rail 107. For example, there are thirteen positive contacts 62P-1 to 62P-13. Also, as described above, in some examples, a continuous negative bus 62N is provided as the other power source connection (e.g., FIG. 11), and in other examples, negative power source connections are provided by individual negative bus contact pads 62N-1 to 62N-13 (e.g., FIG. 12). In other examples, there could be more than thirteen positions or fewer than thirteen positions where a power-consuming electronic firearm device can be attached to the intelligent rail 107, and the number of attachment points may vary as needed or required.

The positive contacts 62P-1, 62P-5 and negative contacts 62N-3, 62N-8 can be continuously powered, such as in the case where only one set of contacts is provided. In other examples, the positive contacts 62P-1, 62P-5 and the negative contacts 62N-3, 62N-8 can be switch activated by snap dome switches 64 placed over the positive and negative contacts.

The snap dome switches 64 can each have a pair of conductive contacts which are normally in the open mode. When the cover of the metallic snap dome switch 64 is depressed via a projection on the exterior surface of the power-consuming electronic firearm device, the conductive contacts mate and provide an electrical connection. The snap dome switches 64 have a curved metal dome that spans the positive and negative contacts such that when depressed, the dome snaps downward to electrically bridge the contacts. The positive contacts 62P and the negative contacts 62N can both be implemented using a low reflectivity contact.

Figure 13:
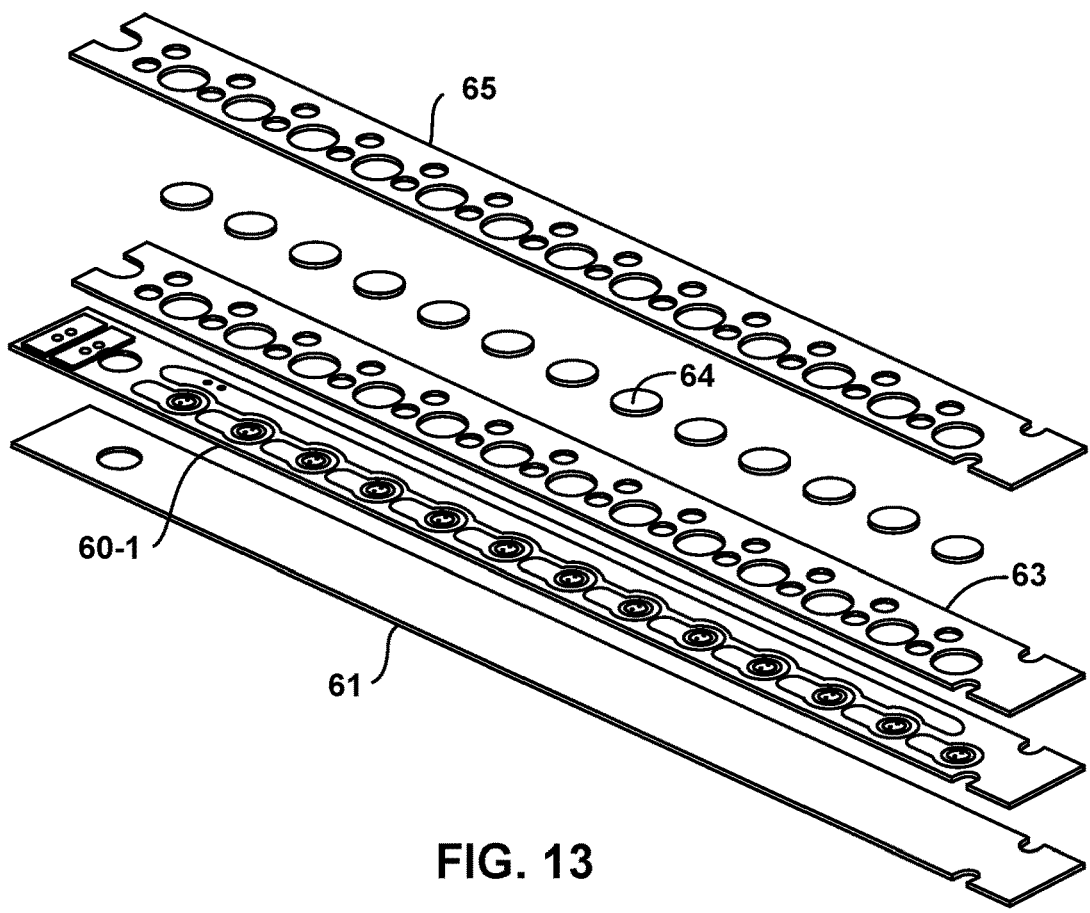
FIG. 13 is an exploded isometric view of a printed circuit board.

FIG. 13 illustrates an exploded view of a power distribution printed circuit board assembly where a non-conductive layer 61 prevents the metal firearm rail from electrically shorting the power distribution printed circuit board 60-1. Spacer layer 63 is a non-conductive element which holds the snap dome switches 64 in place so they do not move laterally during assembly. Snap dome switches 64 provide the electrical switching action to the mounted rail devices. Top cover layer 65 provides environmental protection to the printed circuit board 60-1 and the snap dome switches 64 when the aforementioned layers are assembled.

FIGS. 14 and 15 show the printed circuit boards 60-1 to 60-4 soldered to interconnected conductive busses 72, 74. As shown in FIG. 14, the power rail connector 117 can be pressed into rail pin contacts 131 in the conductive buses 72, 74. Retaining clips 71 made from a resilient metallic spring material are anchored on an upper rail connector 75, and are used to securely hold the upper rail connector 75 together with a lower rail connector 76.

Figure 16:
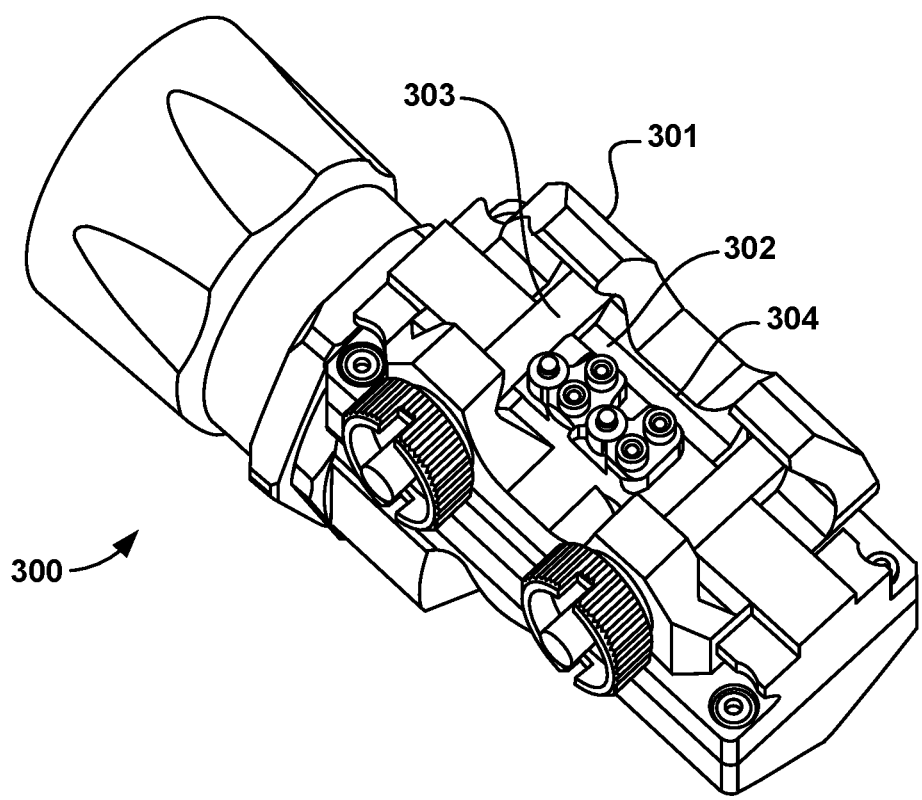
FIG. 16 is a bottom isometric view of an electronic firearm device.

FIG. 16 is a bottom isometric view of an electronic firearm device 300. The electronic firearm device 300 has a rail grabber 301, spring contacts 302, spring plungers 303, and face seals 304. The spring plungers 303 depress the snap dome switches 64, the spring contacts 302 provide electrical contact with the fixed electrical bus contacts 62N and 62P on the intelligent rail 107, and the face seals 304 provide environmental protection.

Figure 17:
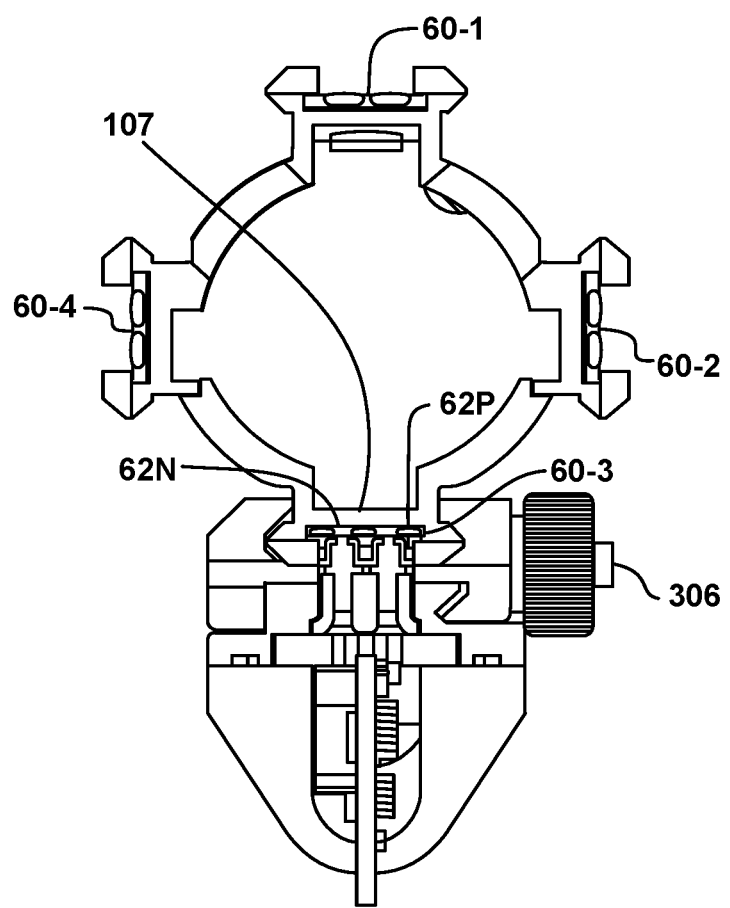
FIG. 17 is a cross-sectional view of the electronic firearm device connected to the intelligent rail.

FIG. 17 is a cross-sectional view of the electronic firearm device 300 connected to the intelligent rail 107. The electronic firearm device 300 can be mechanically attached to the intelligent rail 107 via a screw clamp 306 as shown. As described above, the electronic firearm device 300 includes a pair of spring contacts 302 which contact corresponding low reflectivity contacts 62N and 62P mounted on the printed circuit board 60-3. Similarly, the electronic firearm device 300 has a spring plunger 303 which contacts a corresponding snap dome switch 64 mounted on printed circuit board 60-3.

A challenge of mounting the electronic firearm device 300 to the intelligent rail 107 is that it may not readily interoperate with other electronic firearm devices on the intelligent rail 107, which may use different communication protocols. Thus, the following describes a secure and reliable packet based communication system and method for electronic firearm devices, such as the electronic firearm device 300, and including but not limited to video cameras, lights, laser range finders, radios, night vision products, displays, and computers to communicate with each other and to communicate with external devices when mounted to a firearm.

The communication protocol makes use of the intelligent rail 107 described above, which supplies power from power source 103 to the electronic firearm devices. Because of the shared physical power connection in the intelligent rail 107, data can be shared reliably and securely between the electronic firearm devices. The communication method allows the firearm-mounted devices to interoperate, and through encrypted RF, communicate to remote devices. The medium of the intelligent rail 107 can be used to share data such as commands and controls, configurations, software updates, and sensor data, and also provides for remote operation. In one embodiment, a through-scope video camera communicates over the intelligent rail 107 to a controller module 400. The controller module 400 then uses a communication means, such as Wi-Fi, to communicate a live video stream to an external device 401, such as a smart phone.

Figure 18:
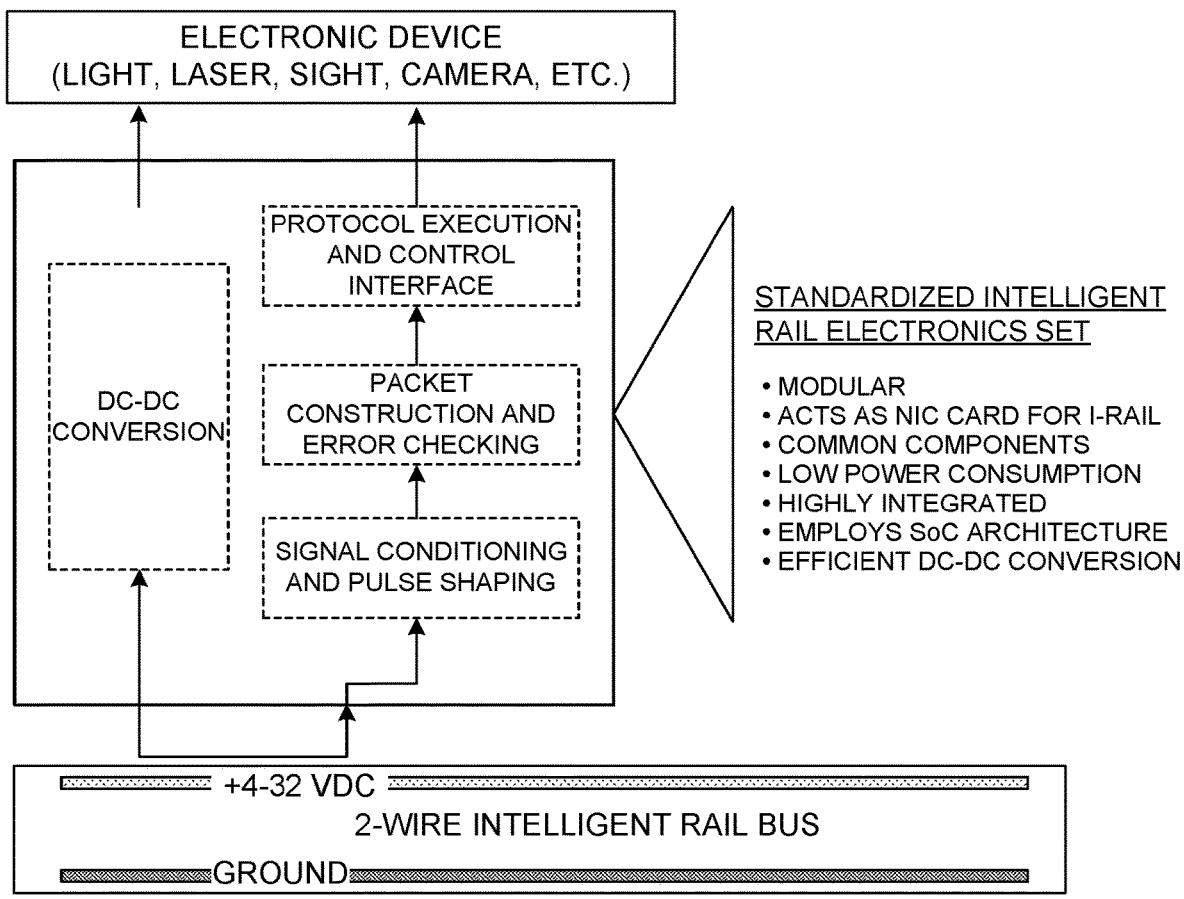
FIG. 18 is a schematic diagram that illustrates a secure and reliable packet based communication system.
Figure 19:
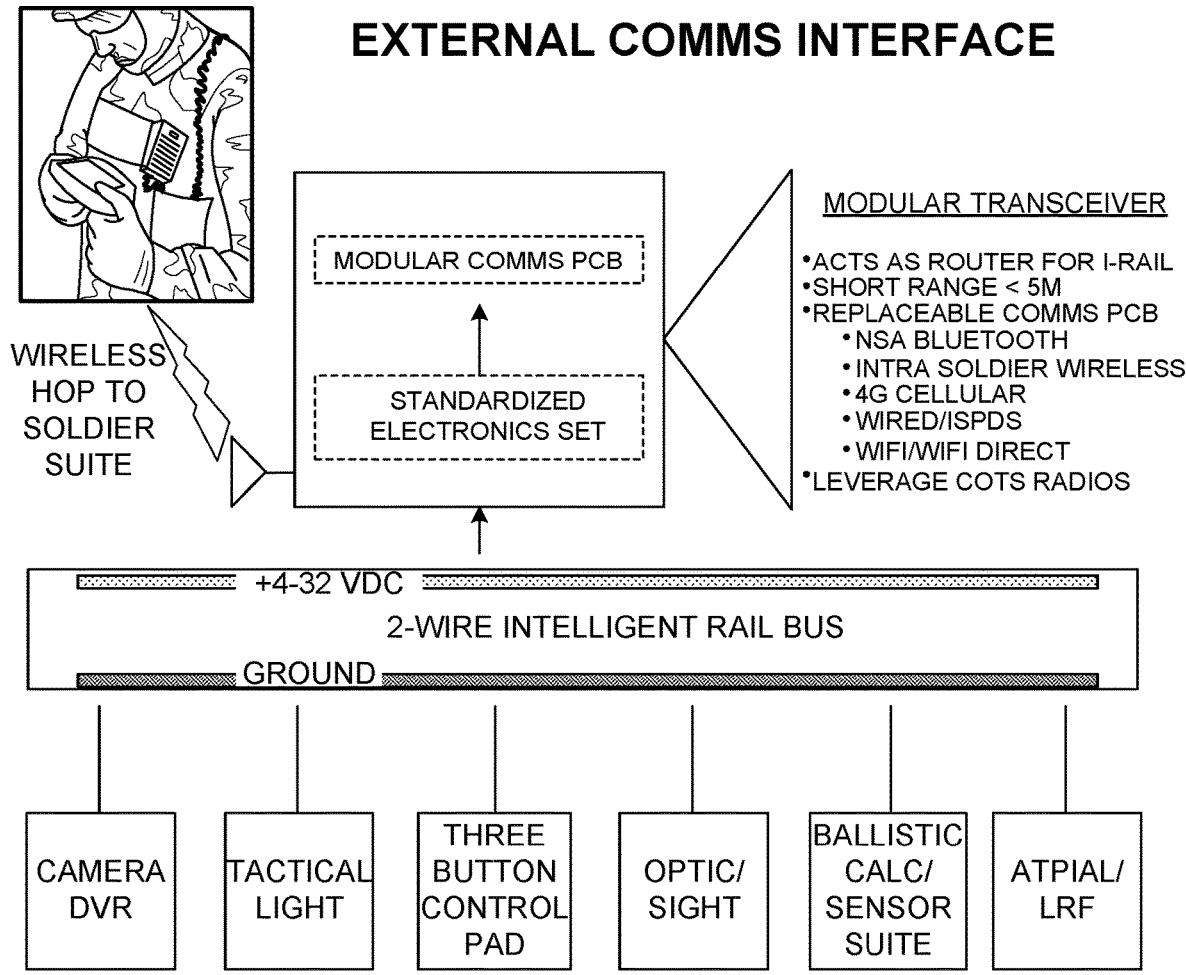
FIG. 19 is schematic diagram that illustrates an external communication interface.

FIG. 18 shows an architecture of the intelligent rail 107 that allows data to be transferred between electronic firearm devices mounted to the intelligent rail 107. FIG. 19 shows an external communication interface for the intelligent rail 107. In some embodiments the intelligent rail 107 superimposes (sums) two voltages including the static voltage that provides the power for powering the electronic firearm devices mounted to the intelligent rail 107, and a second dynamic, time-varying voltage that encodes and transfers data between the electronic firearm devices. In some examples, the (nominally) static voltage for power is coupled from the power source to nodes (i.e., electronic firearm devices), such as via one or more or a series of conductors or inductors. Further, in some examples, the dynamic (signal) voltage is coupled from node to node via a series of capacitors. The ability to transfer data on the intelligent rail 107 facilitates the networking of the electronic firearm devices, including interoperation of video capture and transmission devices.

In some embodiments the external communication interface includes a modular transceiver. In some embodiments the modular transceiver acts as a router for the intelligent rail 107. In some embodiments the module transceiver has short range communication, such as less than 5 meters. In some embodiments the modular transceiver includes a replaceable communications printed circuit board. In some embodiments the modular transceiver utilizes Bluetooth® wireless communication protocol. In another embodiment it utilizes National Security Agency (NSA) Bluetooth®. In some embodiments the modular transceiver utilizes intra soldier wireless. In some embodiments the modular transceiver uses 4G/5G cellular communication. In some embodiments the modular transceiver uses wired communication. In some embodiments the modular transceiver includes integrated soldier power and data management system (ISPDS). In some embodiments the modular transceiver utilizes Wi-Fi or Wi-Fi direct.

Figure 20:
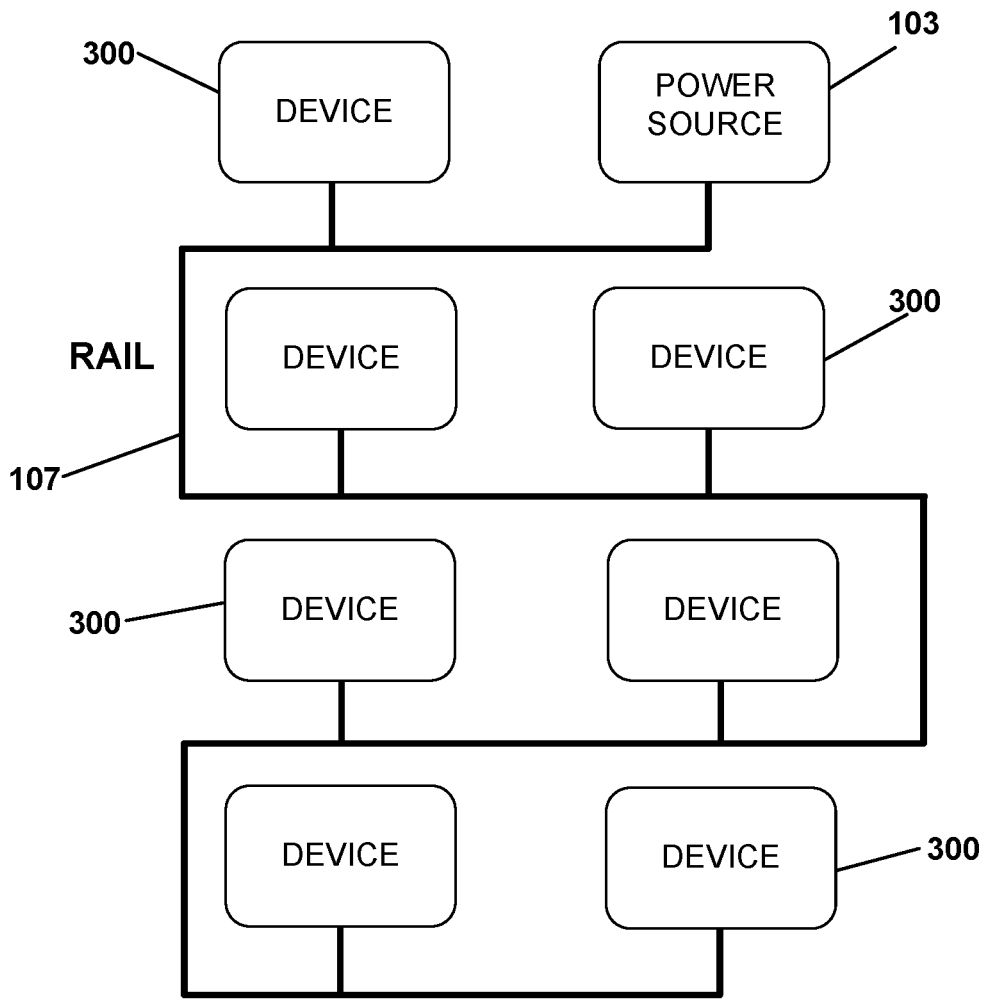
FIG. 20 is schematic diagram that illustrates the intelligent rail and electronic firearm devices connected thereto.

FIG. 20 shows a topology of the intelligent rail 107 and the electronic firearm devices 300 connected thereto. As described above, the power source 103 provides power to the electronic firearm devices 300 via the power distribution system 101. The electrical interconnection for each electronic firearm device 300 on the intelligent rail 107 is also used as the communication medium between each of the electronic firearm devices 300.

The communication protocol provides for full support of industry standard TCP/IP, UDP/IP, and ICMP/IP packet based communication protocols. The packet transmissions are "reliable" in that cyclic redundancy check (CRC) is used, and a sending device receives an acknowledgement packet from a receiving device. Packet retries are also supported. In one example, streaming video is supported using UDP/IP and the "sliding window protocol." Communications are secure using encryption and the network is scalable and extensible.

Figure 21:
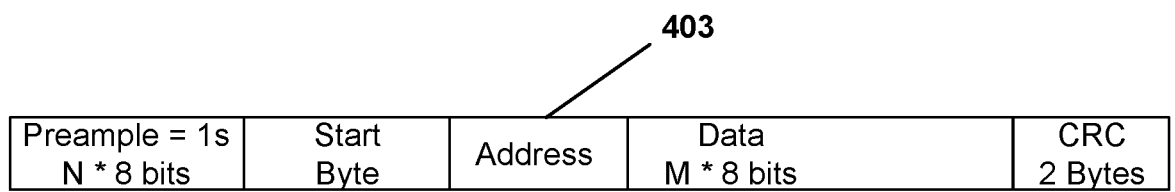
FIG. 21 is a schematic illustration of a packet structure of a communication protocol.

FIG. 21 shows the packet structure 403 of the communication protocol. The IP packets are encapsulated with a preamble (used to recover timing information) and a start byte for synchronization. Node address, packet length, and cyclic redundancy check (CRC) bytes are added to ensure reliable transmission.

The packet flow is as follows: industry standard IP packets are placed in a transmitter of a communication module of an electronic firearm device 300 by a microcontroller in the electronic firearm device 300. The communication module comprises a receiver and a transmitter. In one example, the receiver and the transmitter of the communication module are first in, first out (FIFO) components. The packet is then encapsulated with a preamble, start byte, node destination address, packet length, and CRC bytes. This forms a packet for communication between the electronic firearm devices 300 on the intelligent rail 107. The packet is then converted from bytes to bits, modulation encoded, and then broadcast over the intelligent rail 107 to all electronic firearm devices 300 connected thereto. In one embodiment, Manchester encoding is used as the modulation scheme.

The received packets are demodulated by each electronic firearm device 300 on the intelligent rail 107. Next, an electronic firearm device 300 determines if its address matches the destination address in the packet. If there is an address match, the electronic firearm device 300 converts the packet from bits to bytes, de-encapsulates the packet's header and CRC. The bytes are loaded into the receiver of the communication module of the electronic firearm device 300, and the device's microcontroller is notified. In one example embodiment, the packets are modulated and demodulated by each electronic firearm device 300 according to time-domain multiplexing techniques, but other methods such as frequency-division multiplexing and code division multiplexing or some combination of all the above may be employed.

Communication between electronic firearm devices 300 from different manufactures is accomplished by an established protocol standard. In one embodiment, JSON messages are used as the standard communication protocol between the electronic firearm devices. Where the firearm's communication channel is found to be unreliable or noisy, the packet encapsulation can be extended to include forward error correction (FEC), Viterbi decoding, and ECC. This communication method leverages industry standard Ethernet stack, supports collision detection with retransmission of packet, and provides timing recovery from packet data.

In one example, the communication method described above can be used for video collection and transmission by a video capture and transmission devices that are mounted to a firearm. By communicating on the intelligent rail 107, multiple video capture and transmission devices may be coordinated to deliver a multitude of video streams or to aggregate supplementary data into the video stream and/or to permit coordinated command and control of the video capture and transmission devices.

The intelligent rail 107 permits the use of video capture and transmission devices that can transmit video data externally. For example, this could be of particular value for the collection of and dissemination of video data from armed services or law enforcement. As an example, armed services or law enforcement may seek to gather reconnaissance data for various reasons such as for conducting operations, tactics, and/or combat.

Likewise, video data may be useful for historic records of events. A forward soldier or officer has a privileged position to witness vital information, and the ability to convey that information from his or her environment would provide a wealth of knowledge to peers and commanders. At the same time, the soldier or officer in the field of operation should not be unduly burdened with heavy and/or bulky video equipment. Thus, fitting on a firearm small, lightweight devices of video capture and transmission that are configured to communicate with an external device would provide significant advantages.

The intelligent rail 107 is a medium for digital data exchange between electronic firearm devices as well as a power supply for each device. This reduces the weight and bulk of each video capture and transmission device because each device does not need to have its own power source. The video data is digitized so that it may be compressed and exchanged efficiently with other devices on the intelligent rail 107 and externally to devices separate from the firearm via standardized networking protocols. Furthermore, digitization permits encryption of the data.

Use of the intelligent rail 107 further permits integration of command and control of the video capture and transmission devices by other devices operated by the firearm user, or even by remote operators such as those located at central command or headquarters.

Figure 22:
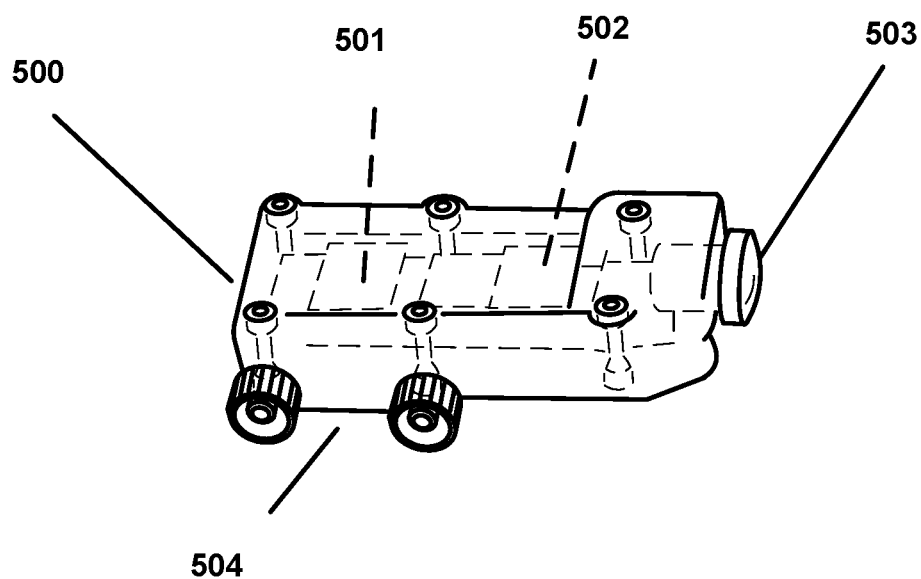
FIG. 22 is an isometric view of a camera node.

FIG. 22 depicts a camera node 500. The camera node 500 includes a lens and integrated image sensor 503, and microprocessors 502 which convert digital video data captured from the lens and integrated image sensor 503 into compressed digital data. The compressed digital data can be used for networked video streams, and in one example, the camera node 500 uses an H.264 for the encoder and MPEG-TS packetization.

A microcontroller and analog interface 501 transfers the compressed data from the camera node 500 to the intelligent rail 107, and transfers data from the intelligent rail 107 to the camera node 500 to control the operation of the camera node 500. The camera node 500 connects to the intelligent rail 107 physically using mechanical and electrical contacts 504.

Multiple camera nodes may be connected to the intelligent rail 107. For example, multiple camera nodes may be used to capture visible light, or infrared light for night vision. The multiple camera nodes may be positioned to aim along the rail of the firearm. Also, by the use of lenses, a camera node may capture an image directly from of the scope of the firearm.

Figure 23:
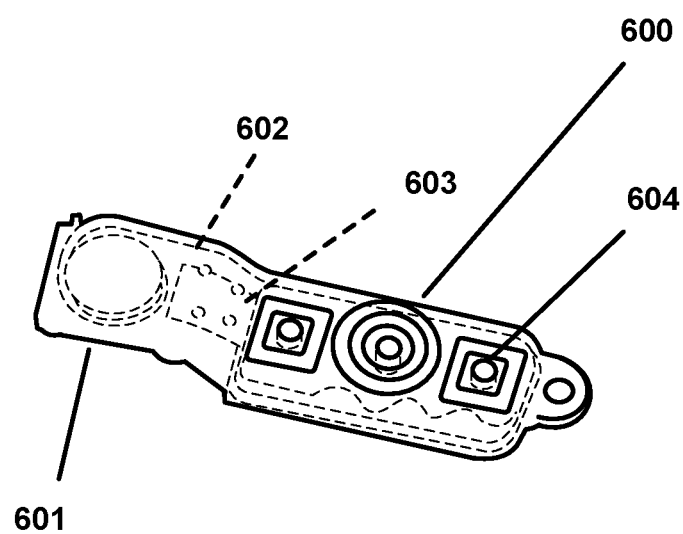
FIG. 23 is an isometric view of a controller node.

FIG. 23 depicts a controller node 600. The controller node 600 has operator buttons 604 and circuits 603 typical of the other electronic firearm devices connected to the intelligent rail 107, such as a microcontroller to operate the controller node 600 and an analog interface to the intelligent rail 107.

The controller node 600 also includes mechanical and electrical interfaces 601 to mechanically and electrically connect the controller node 600 to the intelligent rail 107. The controller node 600 includes an RF (radio frequency) interface 602 which has an antenna and an RF transceiver. The RF interface 602 permits the transfer of data on and off the intelligent rail 107 with external networks. In one example, Wi-Fi 33 is used as an external network for transferring data from the intelligent rail 107 to an external device, such as a smartphone device.

The operation of the camera node 500 and the controller node 600 makes use of the communication protocol described above which utilizes packet transmissions. When power is applied to the intelligent rail 107, electronic firearm devices connected to the intelligent rail 107, including the camera node 500 and the controller node 600, establish network communications amongst themselves. Thus, when a firearm is configured with the intelligent rail 107, one or more camera nodes 500 and the controller node 600 can be operated by a user as follows.

The user can manipulate the operator buttons 604 to select which camera nodes 500 to activate. When activated, the one or more camera nodes 500 capture video data from the lens and integrated image sensor 503. Each of the one more camera nodes 500 convert the video data to digital video data, compress the digital video data according to industry-standard CODEC's, and encapsulate the digital video data into network packets. In one example, each of the one or more camera nodes 500 uses an H.264 for the encoder and MPEG-TS packetization.

The network packets are then transferred to the intelligent rail 107 via the network protocol described above. While the digital video data is being generated, other nodes (i.e., devices) on the intelligent rail 107 may be collecting other types of data, such as position of the user, the bearing of the firearm, range to target, timestamps, etc. This data can be sent from the collecting node (i.e., the device that captures this data) to the camera node 500 or to the controller node 600, where the data may be inserted into the video data stream.

In one example, Key-Length-Value (KLV) is used to embed the data from a collecting node into the video data stream. The data may be encrypted at the camera node 500, or the data may be encrypted at the controller node 600. In one example, encryption is done on the Wi-Fi link using Advanced Encryption Standard (AES). Finally, the video data can be transferred from the intelligent rail 107 of the firearm through an RF interface on the controller node 600 so that the data can be sent to an external device, such as a smartphone device.

Figure 24:
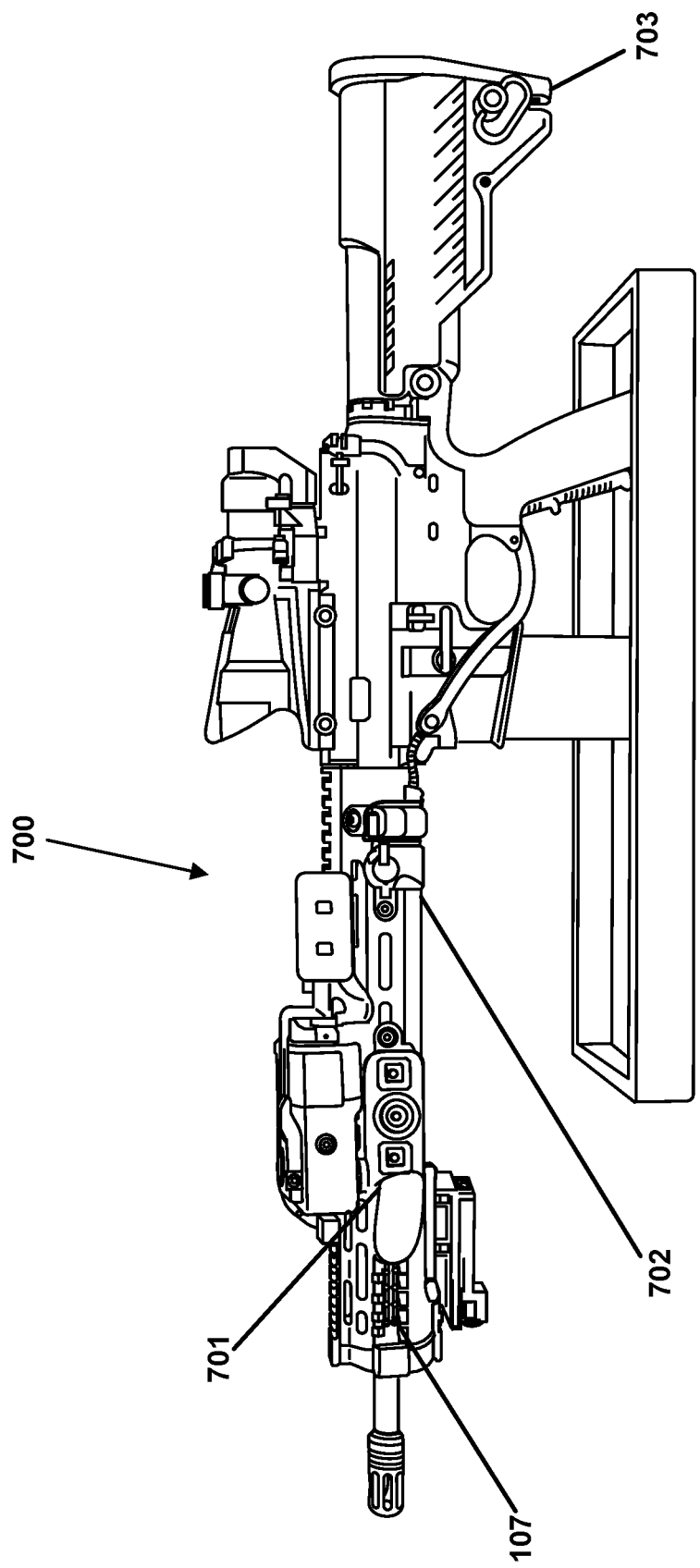
FIG. 24 is a side view of a firearm with the intelligent rail and electronic firearm devices mounted thereto.

FIGS. 24-27 show example implementations of the intelligent rail 107 on a firearm 700. In these examples, the firearm 700 is a carbine assault rifle, however, as discussed above, the intelligent rail 107 is not limited to rifles, and can be implemented on a variety of firearms including handguns. FIG. 24 shows the firearm 700 equipped with a 3-button control pad 701, a master on/off switch 702, and a battery pack 703 which is used in this example as the power source for powering an intelligent rail 107.

Figure 25:
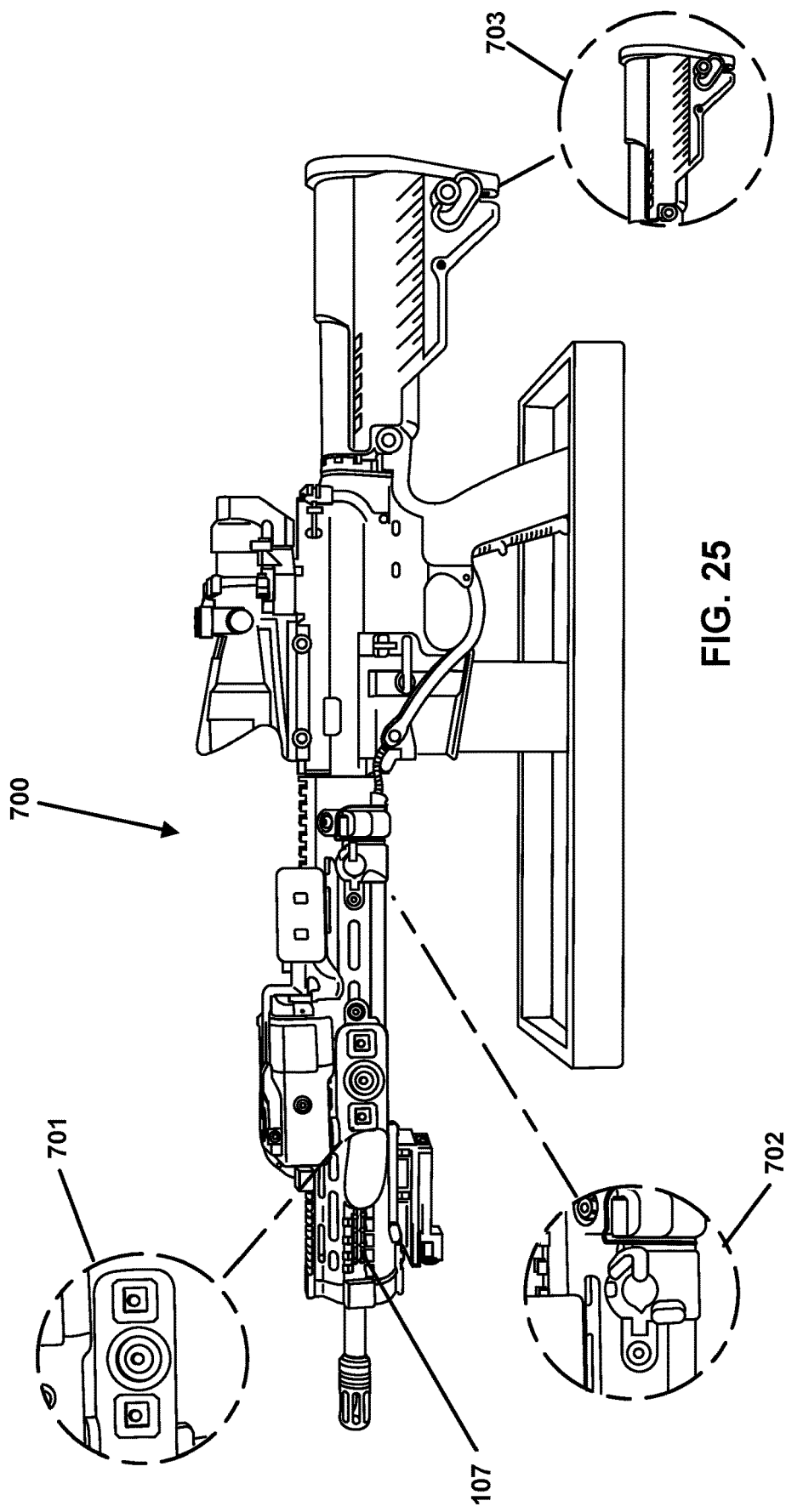
FIG. 25 is a side view of a firearm with the intelligent rail and electronic firearm devices mounted thereto.

FIG. 25 shows close-up views of the 3-button control pad 701 and the master on/off switch 702. The 3-button control pad 701 can be used by the firearm user to activate the one or more electronic devices mounted to the firearm 700 as well as to send data from the one or more electronic devices to an external device such as a smartphone device. The master on/off switch 702 is for turning on or off the intelligent rail 107, and hence, turning on or off the electronic devices mounted to the firearm 700.

Figure 26:
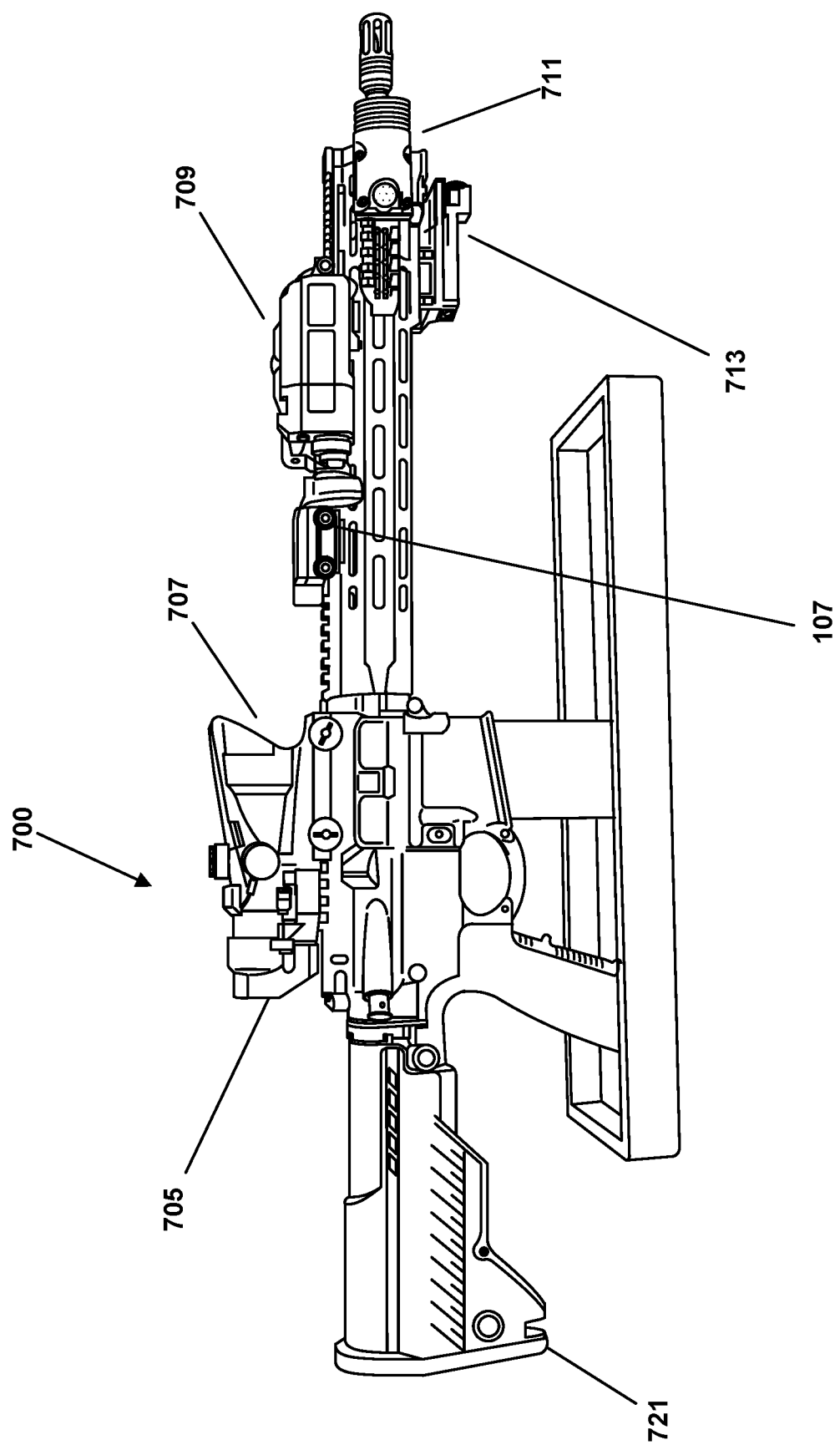
FIG. 26 is a side view of a firearm with the intelligent rail and electronic firearm devices mounted thereto.

FIG. 26 shows multiple electronic firearm devices can be mounted to the intelligent rail 107 on the firearm 700 having an adjustable buttstock 721. For example, electronic firearm devices such as a through-scope camera 705, an optic riflescope 707 such as an M150 ACOG 4×32, an aiming & range-finding laser 709, a white light 711, a wide-angle camera 713, etc. can be mounted to the intelligent rail 107 on the firearm 700.

Figure 27:
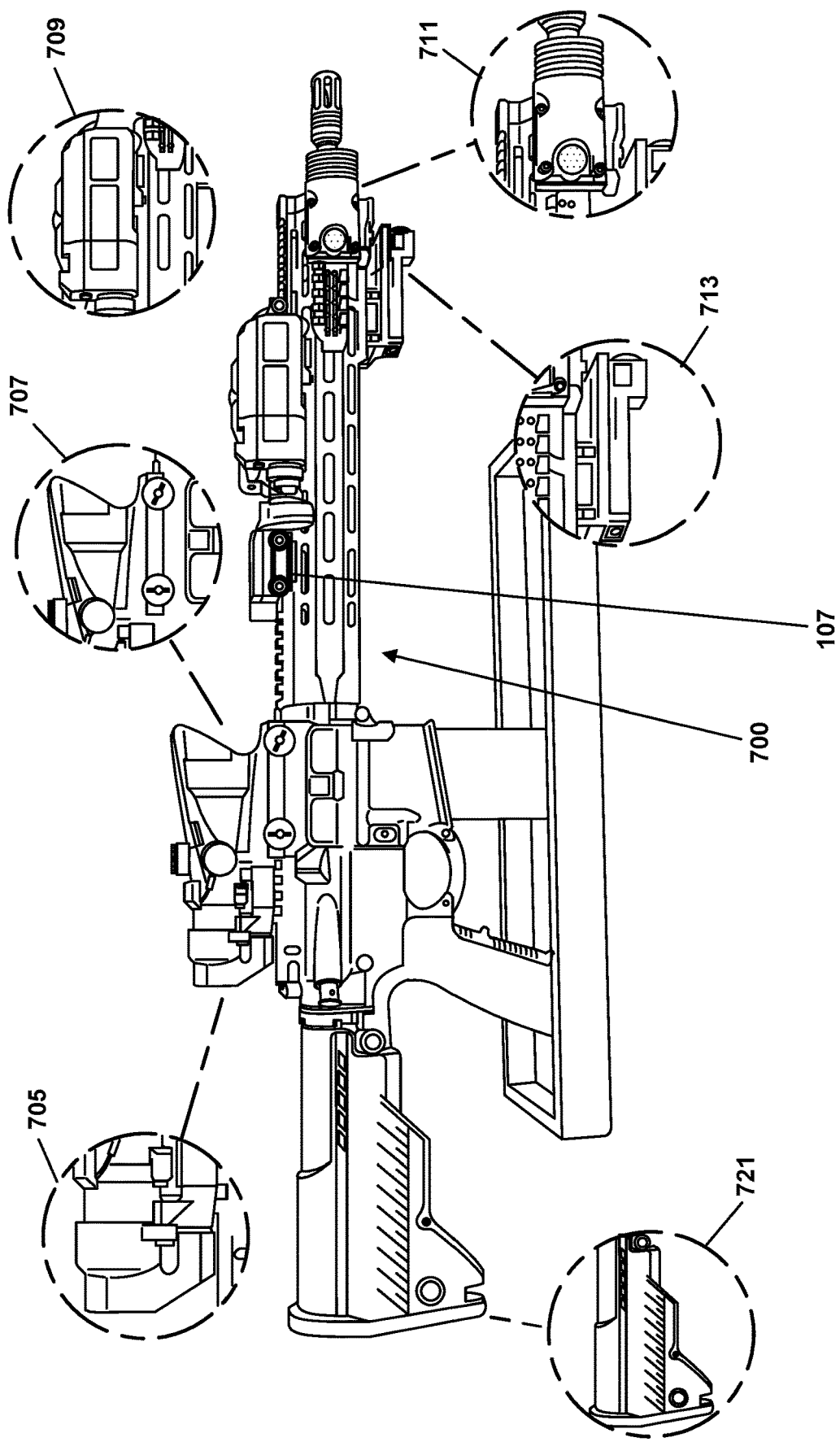
FIG. 27 is a side view of a firearm with the intelligent rail and electronic firearm devices mounted thereto.

FIG. 27 shows close-up views of the through-scope camera 705, the optic riflescope 707, the aiming & range-finding laser 709, the white light 711, and the wide-angle camera 713. The electronic firearm devices shown in FIGS. 26 and 27 are just some examples of the devices that can be mounted to the firearm 700 and it is intended that many more types of electronic firearm devices can be mounted to the intelligent rail 107 of the firearm 700.

Figure 28:
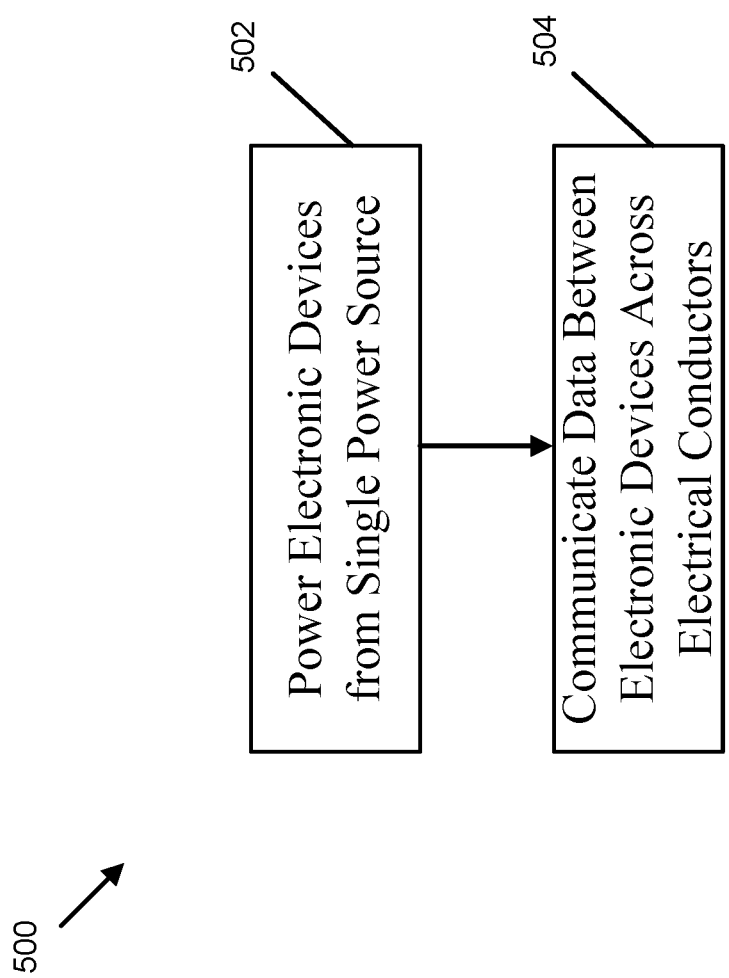
FIG. 28 illustrates a method of communicating between electronic devices connected to a firearm.

FIG. 28 illustrates a method 500 of communicating between electronic devices connected to a firearm. The method 500 includes a step 502 of powering a plurality of electronic devices connected to a firearm from a single power source through one or more electrical conductors. The method 500 further includes a step 504 of communicating data between the plurality of electronic devices across the one or more electrical conductors.

In some examples, the method 500 further includes communicating data from the one or more electrical conductors to an external device. In some examples, the data communicated to the external device is a video stream captured from a video camera connected to the firearm.

In some examples, the method 500 further includes embedding data from a first electronic device into a data stream of second electronic device. In some examples, the method 500 includes encapsulating the data in a packet structure of a communication protocol.

Additional Embodiments

The following embodiments include additional details and can be combined with any one or more the systems, devices, and methods disclosed above.

In some embodiments, the smart (intelligent) rail described herein includes a high-throughput data communication system. In one example, the high-throughput data communication system can communicate data at rates greater than 10 Mbps. In another example the data rates are greater than 100 Mbps. In another example, the high-throughput data communication system utilizes multi-frequency encoding. One example of multi-frequency encoding is orthogonal frequency division multiplexing (OFDM). Some embodiments further include a data communication system that can selectively communicate through multiple data communication channels, such as a higher data rate channel and a lower data rate channel.

Data communication rates of greater than 10 Mbps or greater than 100 Mbps can be achieved by using multi-frequency encoding, which operates to spread the modulated signal across multiple frequencies and amplitudes. Examples of multi-frequency encoding techniques include OFDM (Orthogonal Frequency Division Multiplexing) and xQAM (Quadrature Amplitude Modulation). Such encoding techniques can obtain a higher data rate from the same physical bus structure.

In QAM, the carrier with angular frequency ω is used twice with a 90° phase shift. Two independent baseband signals are then modulated by means of multiplicative mixing. The two modulated signals are then added to obtain the transmission signal. The quantized QAM (xQAM) extends the QAM to include methods for the transmission of discrete-value and time-discrete signal sequences, also referred to as digital signals.

Figure 29:
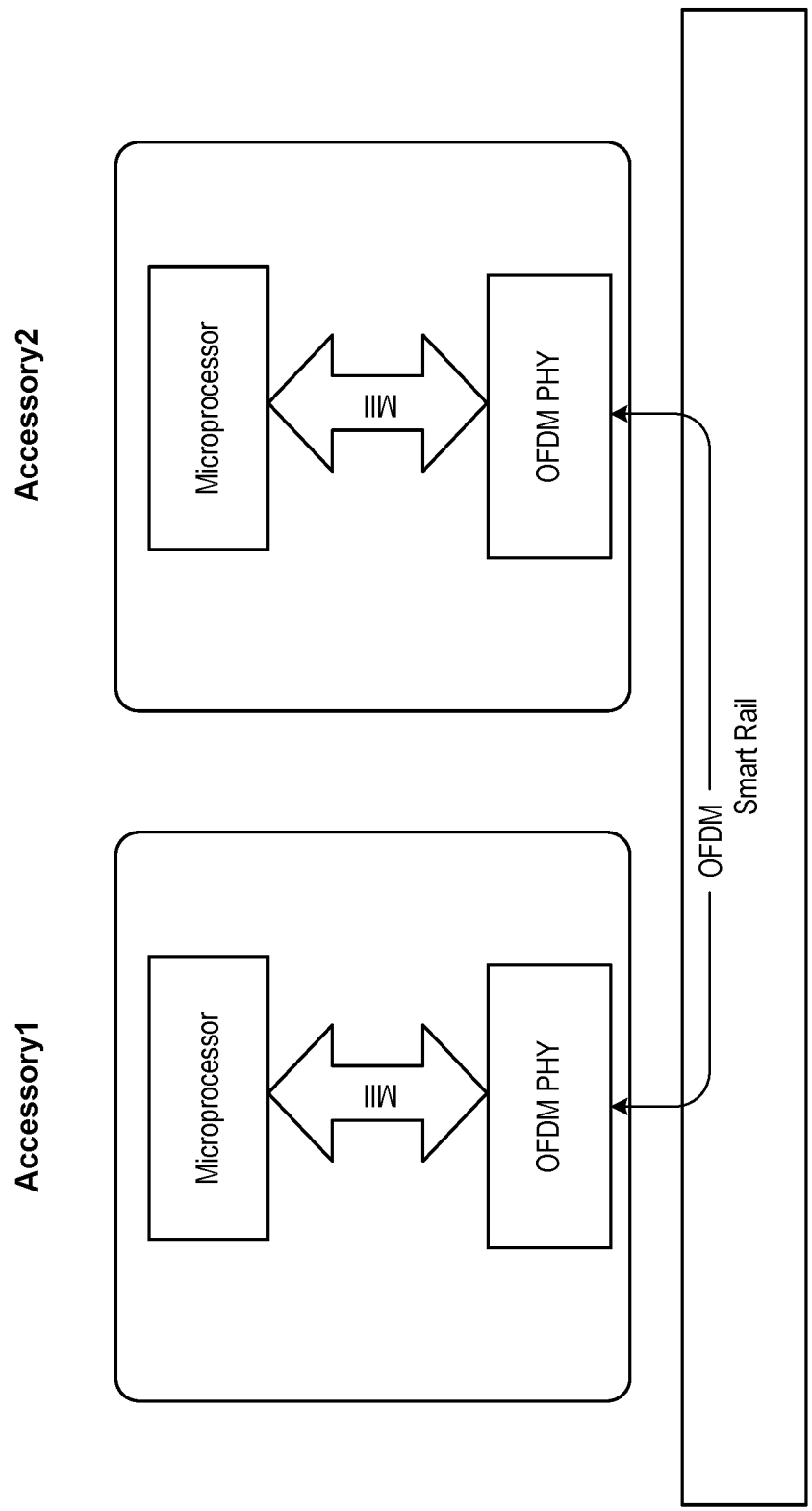
FIG. 29 illustrates an example of a high-throughput data communication system for a firearm.

FIG. 29 illustrates an example of a high-throughput data communication system for a firearm. In this example, the communication system includes a smart rail and a plurality (e.g., two or more) accessories mounted on the smart rail. The accessories include a processor, a data communication bus, and a data communication device.

In this example, the data communication bus is an interface bus. An example of the interface bus is a PHY-to-MAC interface bus. An example of a PHY-to-MAC interface bus is a media-independent interface (MII) bus.

An example of the data communication device is a multi-frequency encoding device. An example of a multi-frequency encoding device is an orthogonal frequency-division multiplexing (OFDM) device.

The accessories can communicate with each other through the smart rail, as shown.

Figure 30:
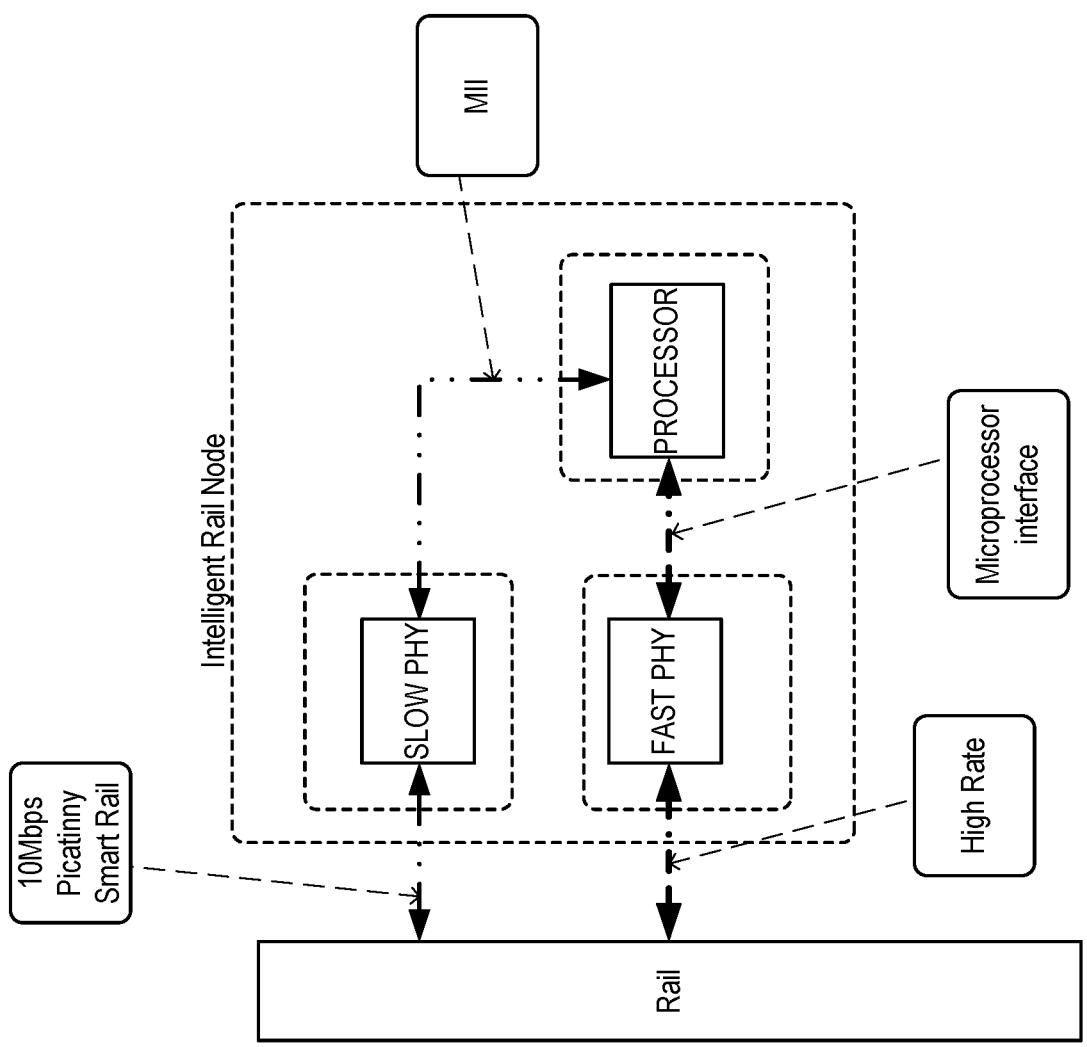
FIG. 30 is a schematic block diagram illustrating another example data communication system according to the present disclosure.

FIG. 30 is a schematic block diagram illustrating another example data communication system according to the present disclosure. In this example, the data communication system includes a node for data communication across a rail. The node includes a processor, one or more interfaces (MII and Microprocessor Interface), a lower data rate communication device, and a higher data rate communication device.

The interfaces provide data communication between the processor and the data communication devices. One example of an interface a PHY-to-MAC interface. An example of the PHY-to-MAC interface is the media-independent interface (MII). In this example, the PHY-to-MAC interface is used for communication between the processor and the lower data rate communication device. An example of the MII interface is defined by the IEEE 802.3U standard. Another example of an interface is the microprocessor interface, which in this example is used for communication between the processor and the higher data rate communication device.

As discussed herein, the smart rail technology offers data exchange over the power-providing accessory-mounting rail of a rifle. The multiple accessories share a single medium for data exchange, using time-division multiple access (TDMA.) In some embodiments the standard data rate of the Smart Rail is 10 Mbps. That rate is good for low-cost, low-power applications, but there are advantages to high data throughput for other applications.

In smart rail technology, a base-band signaling is desirable, because while the smart rail medium is typically under 1 m long, rail segments are long enough to act as an antenna for frequencies found in practical data signaling. But in some embodiments it is important that data not be accessible off the weapon in the rifle applications.

A challenge faced in increasing bit rates on Smart Rails, is that as the signal bandwidth increases, and as different accessories are affixed to the Smart Rail, the amount and position of unintentional capacitive loads varies, with the impact mostly occurring at higher frequencies.

In the smart rail system, multiple rifle accessories share two conductors on the firearm's accessory rail. Those conductors deliver power to each accessory device and also data, which can be exchanged among any device. Therefore, it is important for the multiple devices to be able to communicate using a common data communication protocol. In some embodiments, using time-division multiple access (TDMA) on the Smart Rail allows the medium to lie idle for power savings.

As discussed above, in some embodiments the Smart Rail data is represented using Manchester encoding at a rate of 10 million symbols per second. Data is exchanged in discrete packets that mostly follow the standards of 10Base2 Ethernet; thus, the packets contain a preamble, start code, source address, destination address, payload, checksum, etc.

The Manchester encoding has a spectral efficiency that is well below that of other coding methods; furthermore, it is rather sensitive to phase distortions. The threat of phase distortion is common in a Smart Rail because the accessories placed into any particular system may vary greatly in the number of accessories deployed, their manufacturer and their particular characteristics, especially load capacitance.

Although it would be possible to increase data at a rate faster than achieved by 10base2, by scaling up the bit rate, such implementations are susceptible to phase distortion on the Smart Rail.

Accordingly, some embodiments include an alternative data communication device and data communication protocol that can provide higher speed data communication rates without the drawbacks discussed above. One suitable technique involves utilizing a multi-frequency encoding scheme.

In some embodiments, the data communication devices utilizes a frequency encoding scheme. One example of a multi-frequency encoding scheme is orthogonal frequency-division multiplexing (OFDM) modulation technology, which by spectral efficiency can deliver high bit rate within a low-bandwidth, baseband channel. (N.B.—The term OFDM is used here, with multiplexing not intended to describe multiple simultaneous accesses to the communication medium, but rather, to describe that rather than sending data as serial bits, multiple bits are sent in parallel as OFDM-encoded symbols, i.e. simultaneous streams employing multiple frequency bands.)

Furthermore, multi-frequency encoding and OFDM can be used in conjunction with TDMA where various TDMA protocols such as collision detection, collision avoidance, bus master, etc. govern multiple access to the shared data medium.

Multi-frequency encoding and OFDM communication can be tailored to communication channels that are not ideal, using so-called water filling, where the frequency channels that perform well can sustain higher bit rates, and the channels where impairments are greater, can employ lower bit rates, or even remain unused.

Accordingly, some embodiments make use an OFDM-capable PHY, which acts as a transceiver between a digital-logic MII bus to the Smart Rail medium, where the data is encoded and exchanged as OFDM.

In this way, the multiple microprocessors can communicate with each other according to the concept of the OSI Model, or more practically, the Internet Protocol Suite.

The MII bus is useful for Ethernet communication. Using different PHY IC's, the digital interface can employ standards other than MII as well, including reduced media-independent interface (RMII), gigabit media-independent interface (GMII), SD, etc.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. An electronic system for a firearm, the electronic system comprising:
    a rail including one or more electrical conductors, the conductors being configured to receive power from a power source; and
    a plurality of electronic devices mountable on the rail to connect the electronic devices to the one or more electrical conductors, each electronic device having:
        an electrical input configured to receive power from the one or more electrical conductors; and
        a communication device configured for data communication across the one or more electrical conductors, wherein the communication device utilizes multi-frequency encoding for the data communication across the one or more electrical conductors of the rail, and the communication device is configured for data communication at rates greater than 10 megabit per second.

2. The electronic system of claim 1, wherein the multi-frequency encoding is orthogonal frequency-division multiplexing.

3. The electronic system of claim 1, wherein at least one of the electronic devices comprises a PHY-to-MAC bus in data communication with the communication device.

4. The electronic system of claim 3, wherein the PHY-to-MAC bus is a media-independent interface bus in data communication with the communication device.

5. The electronic system of claim 1, wherein the communication device comprises at least two communication devices, including a lower data rate communication device and a higher data rate communication device.

6. The electronic system of claim 5, wherein the lower data rate communication device utilizes Manchester encoding.

7. The firearm comprising the electronic system of claim 1.

8. The electronic system of claim 1, wherein the communication device is a first communication device configured for data communication at rates greater than 10 megabit per second; and further comprising a second communication device configured for data communication across the one or more electrical conductors at rates lower than 10 megabit per second.

9. The electronic system of claim 8, wherein the second communication device utilizes time domain multiplexing for the data communication across the one or more electrical conductors of the rail.

10. A rail-mountable accessory configured to be mounted to a rail, the rail including one or more electrical conductors configured to receive power from a power source, the rail-mountable accessory comprising:
    a power consuming component configured to receive and be powered by power on the rail conductors; and
    a communication device configured for data communication across the one or more electrical conductors, wherein the communication device is configured to communicate using multi-frequency encoding for the data communication across the one or more electrical conductors of the rail and the communication device is configured for data communication at rates greater than 10 megabit per second.

11. The rail-mountable accessory of claim 10, wherein the multi-frequency encoding is Orthogonal Frequency Division Multiplexing (OFDM) encoding.

12. The rail-mountable accessory of claim 10, wherein the multi-frequency encoding is Quadrature Amplitude Modulation.

13. The rail-mountable accessory of claim 10, wherein the multi-frequency encoding is quantized Quadrature Amplitude Modulation (xQAM).

14. The rail-mountable accessory of claim 10, wherein the communication device is a first communication device configured for data communication at rates greater than 10 megabit per second; and further comprising a second communication device configured for data communication across the one or more electrical conductors at rates lower than 10 megabit per second.

15. An intelligent rail system for a firearm, the intelligent rail system comprising:
 a power source;
 one or more electrical conductors electrically connected to receive power from the power source, at least part of the one or more electrical conductors being arranged on a rail; and
 a plurality of electronic devices, at least one electronic device is mounted to the rail, and each electronic device having:
  an electrical input configured to receive power from the one or more electrical conductors to power the electronic device; and
  a communication device configured for data communication across the one or more electrical conductors at a data rate greater than 10 megabit per second using multi-frequency encoding for the data communication across the one or more electrical conductors of the rail.

16. The intelligent rail system of claim 15, wherein the communication device is a first communication device configured for data communication at rates greater than 10 megabit per second; and further comprising a second communication device configured for data communication across the one or more electrical conductors at rates lower than 10 megabit per second.

17. A method of communicating between electronic devices connected to a firearm, the method comprising:
 powering a plurality of electronic devices connected to a firearm from a single power source through one or more electrical conductors; and
 communicating data between the plurality of electronic devices across the one or more electrical conductors at data rates greater than 10 megabit per second using multi-frequency encoding for the data communication across the one or more electrical conductors.

18. The method of claim 17, wherein the communication device is a first communication device configured for data communication at rates greater than 10 megabit per second; and further comprising a second communication device configured for data communication across the one or more electrical conductors at rates lower than 10 megabit per second.

* * * * *